(12) United States Patent
Ko et al.

(10) Patent No.: US 11,825,157 B2
(45) Date of Patent: Nov. 21, 2023

(54) DISPLAY APPARATUS AND OPERATING METHOD THEREOF

(71) Applicant: SAMSUNG ELECTRONICS CO., LTD., Suwon-si (KR)

(72) Inventors: Euna Ko, Suwon-si (KR); Sehyun Kim, Suwon-si (KR); Kwansik Yang, Suwon-si (KR); Jongin Lee, Suwon-si (KR); Dahee Jeong, Suwon-si (KR); Kilsoo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 347 days.

(21) Appl. No.: 17/152,865

(22) Filed: Jan. 20, 2021

(65) Prior Publication Data

US 2021/0227290 A1 Jul. 22, 2021

(30) Foreign Application Priority Data

Jan. 20, 2020 (KR) ........................ 10-2020-0007384

(51) Int. Cl.
*H04N 21/4402* (2011.01)
*H04N 21/437* (2011.01)
*H04N 21/6547* (2011.01)
*G06N 3/08* (2023.01)
*G06N 3/045* (2023.01)

(52) U.S. Cl.
CPC ..... *H04N 21/440263* (2013.01); *G06N 3/045* (2023.01); *G06N 3/08* (2013.01); *H04N 21/437* (2013.01); *H04N 21/6547* (2013.01)

(58) Field of Classification Search
None
See application file for complete search history.

(56) References Cited

U.S. PATENT DOCUMENTS

| | | | |
|---|---|---|---|
| 8,165,197 B2 | 4/2012 | Douma et al. | |
| 8,495,681 B2 | 7/2013 | Miki | |
| 9,146,893 B1 * | 9/2015 | Garg | .................... H04N 21/472 |

(Continued)

FOREIGN PATENT DOCUMENTS

| | | |
|---|---|---|
| EP | 1 589 434 A1 | 10/2005 |
| KR | 10-1069075 B1 | 9/2011 |

(Continued)

OTHER PUBLICATIONS

International Search Report dated Apr. 19, 2021 issued by the International Searching Authority in counterpart International Application No. PCT/KR2021/000736 (PCT/ISA/210).

(Continued)

*Primary Examiner* — Junior O Mendoza
(74) *Attorney, Agent, or Firm* — Sughrue Mion, PLLC

(57) ABSTRACT

An operating method of a display apparatus includes transmitting a transmission request for content-related information and resolution information of the display apparatus to a server, receiving the content-related information corresponding to the transmission request from the server, obtaining a final resolution by classifying a resolution of content included in the content-related information, based on whether the display apparatus supports upscaling, and displaying information about the content, the information including the final resolution.

20 Claims, 16 Drawing Sheets

(56) References Cited

U.S. PATENT DOCUMENTS

| | | | |
|---|---|---|---|
| 2014/0298406 A1 | 10/2014 | King et al. | |
| 2015/0026753 A1 | 1/2015 | Abbruzzese | |
| 2016/0197978 A1* | 7/2016 | Morita | G06F 16/248 |
| | | | 709/219 |
| 2017/0013231 A1 | 1/2017 | Kwon | |
| 2018/0286355 A1* | 10/2018 | Kim | G06F 1/3212 |
| 2019/0028743 A1* | 1/2019 | He | H04N 21/2225 |
| 2019/0373277 A1* | 12/2019 | Tsukagoshi | H04N 21/440263 |
| 2020/0053408 A1 | 2/2020 | Park et al. | |
| 2020/0162789 A1* | 5/2020 | Ma | H04N 21/440263 |
| 2020/0228820 A1* | 7/2020 | Joshi | H04N 19/619 |

FOREIGN PATENT DOCUMENTS

| | | |
|---|---|---|
| KR | 10-1530387 B1 | 6/2015 |
| KR | 10-2022648 B1 | 9/2019 |

OTHER PUBLICATIONS

Communication dated Aug. 1, 2022, issued by the European Patent Office in counterpart European Application No. 21744727.5.
"2.3.7 Codecs Developmnet," Chris Johns Sky PLC, CM-AVC0529_CM-AVC0528_draft-contributionfor-CM-S-LTV-on-codecs_CJ.docx, DVB, Digital Video Broadcasting, C/O Ebu—17A Ancienne Route—CH-1218 Grand Saconnex, Geneva—Switzerland, Oct. 11, 2019, XP017858057, Total 20 pages.

* cited by examiner

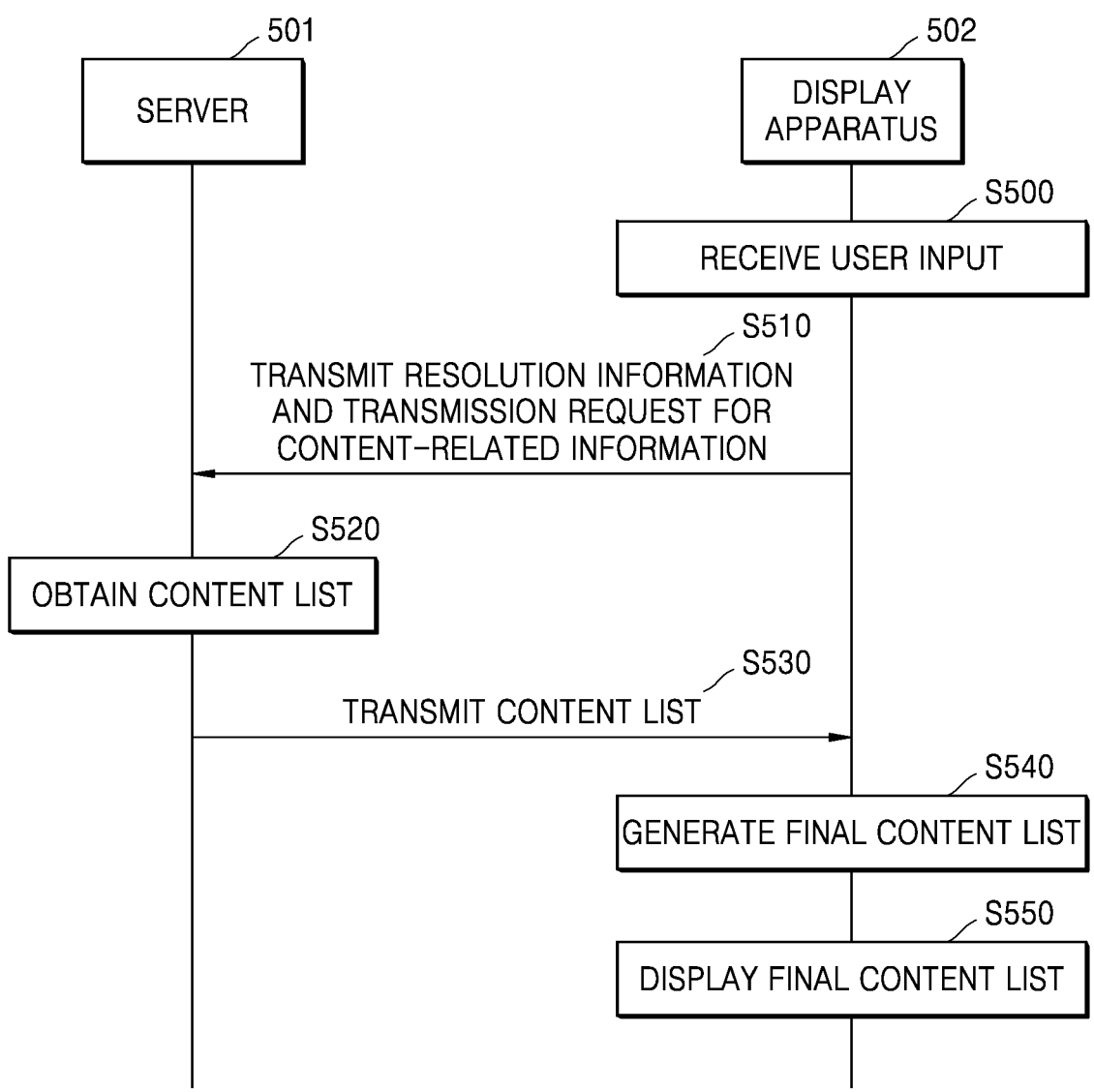

DISPLAY APPARATUS AND OPERATING METHOD THEREOF

CROSS-REFERENCE TO RELATED APPLICATION

This application is based on and claims priority under 35 U.S.C. § 119 to Korean Patent Application No. 10-2020-0007384, filed on Jan. 20, 2020, in the Korean Intellectual Property Office, the disclosure of which is incorporated by reference herein in its entirety.

BACKGROUND

1. Field

The disclosure relates to a display apparatus and an operating method thereof, and more specifically, to a display apparatus for providing information about contents and an operating method of the display apparatus.

2. Description of Related Art

With the spread and development of display technologies, display apparatuses having various forms and functions have been developed.

As such, functions meeting various demands or intentions of consumers may be implemented by using such display apparatuses.

A display apparatus may be connected to various wired or wireless communication networks to receive at least one of a plurality of contents via a connected communication network.

Alternatively, a content provider such as NETFLIX, AMAZON, etc., may distribute an application for providing contents in a display apparatus to provide various contents, such as movies, dramas, etc., to a user. The application may be software and/or a program for executing a specific service or operation. For example, NETFLIX may produce a 'Netflix application' installable in a display apparatus and distribute the application to a user through an App Store, etc., to provide various contents to the user. In another example, AMAZON may produce a 'Prime Video application' installable in the display apparatus and distribute the application to the user through the App Store, etc., to provide various contents to the user. Then, the user may install a content providing application such as the NETFLIX application, etc., in the display apparatus, execute the content providing application, and search for and view content among various contents provided by the content provider (e.g., NETFLIX). Hereinbelow, for convenience of description, the application of the content provider may be referred to as a 'content providing application'. In addition, the content provider may be a server that stores, manages, and/or transmits content. For convenience of description, the server that stores, manages, and/or transmits content may be referred to as a 'content providing server'.

The content providing application may receive, from the content providing server, information about at least one of contents retained by the content provider.

Then, the content providing application may provide a screen including information about content (specifically, a user interface screen) to the user by using received information, and the user may view content through the provided user interface screen. In this case, the user may desire content with better quality or a specific resolution, to thereby improve a viewing satisfaction.

There is therefore a need for a display apparatus and an operating method thereof, whereby the user may rapidly and accurately search for content of a particular resolution.

SUMMARY

Provided are a display apparatus and an operating method thereof, which allow a user to rapidly and accurately search for content of a particular resolution.

Further, provided are a display apparatus and an operating method thereof, whereby a resolution may be accurately classified and information about content including the accurately classified resolution may be provided to a user.

Additional aspects will be set forth in part in the description which follows and, in part, will be apparent from the description, or may be learned by practice of the presented embodiments.

In accordance with an aspect of the disclosure, an operating method of a display apparatus includes: transmitting, to a server, a transmission request for content-related information and resolution information of the display apparatus; receiving, from the server, the content-related information corresponding to the transmission request; obtaining a final resolution, by classifying a resolution of content, included in the content-related information, based on whether the display apparatus supports upscaling; and displaying a screen that provides information for the content, including the final resolution.

The obtaining the final resolution may include determining whether to classify a resolution of the content downscaled using a first scheme as a higher resolution, based on whether the display apparatus supports upscaling and obtaining the final resolution based on a result of the determining.

The determining may include classifying the resolution of the content downscaled using the first scheme as the higher resolution when the display apparatus supports upscaling using a second scheme corresponding to the first scheme.

The obtaining the final resolution may include obtaining a value as the final resolution, the value being equal to the resolution of the content downscaled using the first scheme, when the display apparatus does not support upscaling using the second scheme corresponding to the first scheme.

The first scheme may be a scheme to downscale a resolution by performing artificial intelligence (AI) encoding, and the second scheme may be a scheme to upscale a resolution by performing AI decoding.

When the content is content downscaled using a first scheme, the content-related information may include information indicating that the content is downscaled content and includes the resolution of the content.

The transmission request may include a transmission request for a content list of contents retained by the server, and the operating method may further include generating a final content list including at least one of the final resolution respectively corresponding to at least one content.

The content list may include a plurality of contents including first content that is downscaled using a first scheme to have a first resolution, and the obtaining of the final resolution may include obtaining the final resolution by classifying the resolution of the first content as a second resolution that is higher than the first resolution, when the display apparatus supports upscaling using a second scheme corresponding to the first scheme.

The obtaining the final resolution may include obtaining the final resolution by classifying the resolution of the first content as the first resolution, when the display apparatus does not support upscaling using the second scheme.

The generating the final content list may include, when the plurality of contents included in the content list include the first content that has the first resolution and is downscaled using the first scheme, classifying the first content as a content group corresponding to the second resolution higher than the first resolution, when the display apparatus supports upscaling using the second scheme corresponding to the first scheme, and classifying the first content as a content group corresponding to the first resolution, when the display apparatus does not support upscaling using a second scheme corresponding to the first scheme.

The transmission request may be a transmission request for a partial list including contents corresponding to a first resolution, and the operating method may further include generating a final content list including at least one of the final resolution respectively corresponding to at least one content included in the partial list, and, and when the display apparatus supports upscaling, the final content list may include at least one content having the first resolution and at least one content downscaled to have a third resolution lower than the first resolution, among all of the contents retained by the server.

When the display apparatus supports upscaling, the final content list may include at least one content having the first resolution and at least one content downscaled to have a third resolution lower than the first resolution, among all of the contents retained by the server.

In accordance with another aspect of the disclosure, a display apparatus includes a display, a communicator configured to communicate with a server, and a processor configured to execute at least one instruction. The processor may be further configured to, by executing the at least one instruction, control the communicator to transmit a transmission request for content-related information and resolution information of the display apparatus to a server, receive the content-related information corresponding to the transmission request from the server through the communicator, obtain a final resolution, by classifying a resolution of content, included in the content-related information, based on whether the display apparatus supports upscaling, and display a screen that provides information for the content, including the final resolution, on the display.

The processor may be further configured to, by executing the at least one instruction, determine whether to classify a resolution of the content downscaled using a first scheme as a higher resolution, based on whether the display apparatus supports upscaling.

The processor may be further configured to, by executing the at least one instruction, obtain the final resolution by classifying the resolution of the content downscaled using the first scheme as the higher resolution when the display apparatus supports upscaling using a second scheme corresponding to the first scheme.

The processor may be further configured to, by executing the at least one instruction, obtain a value as the final resolution, the value being equal to the resolution of the content downscaled using the first scheme, when the display apparatus does not support upscaling using the second scheme corresponding to the first scheme.

The processor may include an artificial intelligence (AI) decoder configured to upscale a resolution of content to a higher resolution by performing AI decoding, the content having been being downscaled using a first scheme.

The AI decoder may include a deep neural network (DNN) configured to receive an input of image data corresponding to the content, upscale a resolution of the image data, and output an image which has the upscaled resolution.

The transmission request may include a transmission request for a content list of contents retained by the server, and the processor may be further configured to, by executing the at least one instruction, generate a final content list including at least one of the final resolution respectively corresponding to at least one content.

The content list may include a plurality of contents including first content that is downscaled using a first scheme to have a first resolution, and the processor may be further configured to, by executing the at least one instruction, obtain the final resolution by classifying the resolution of the first content as a second resolution that is higher than the first resolution, when the display apparatus supports upscaling using a second scheme corresponding to the first scheme.

In accordance with another aspect of the disclosure, a non-transitory computer-readable recording medium has recorded thereon instructions executable by at least one processor to perform an operating method of an image processing device, the operating method including: transmitting, to a server, a transmission request for content-related information and resolution information of a display; receiving, from the server, the content-related information corresponding to the transmission request; obtaining a final resolution by classifying a resolution of content, included in the content-related information, based on whether the display supports upscaling; and outputting for display, on the display, information for the content, the information including the final resolution.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5C is a diagram showing operations performed to provide a content list, according to an embodiment;

DETAILED DESCRIPTION

Figure 1:
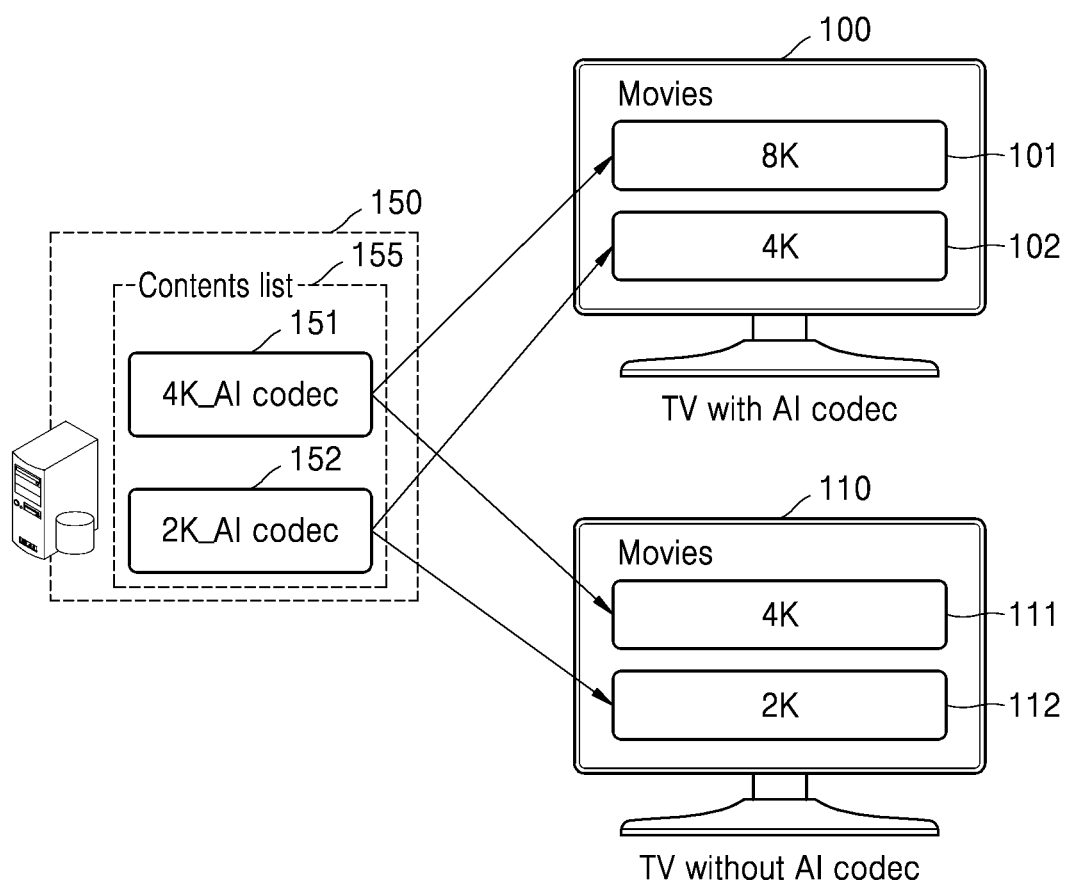
FIG. 1 is a diagram for describing a display apparatus to which content is provided from a content provider.

Hereinafter, embodiments of the disclosure will be described in detail with reference to the attached drawings to allow those of ordinary skill in the art to easily carry out the embodiments of the disclosure. However, the disclosure may be implemented in various forms, and is not limited to embodiments specifically described herein. To clearly describe the disclosure, parts that are not associated with the description may be omitted from the drawings, and throughout the specification, similar reference numerals refer to similar parts.

Throughout the specification, when a part is "connected" to another part, the part is not only "directly connected" to another part but may also be "electrically connected" to another part with another device intervening therebetween. When it is assumed that a certain part "includes" a certain component, it means that a corresponding component may further include other components unless a specific meaning opposed to the corresponding component is provided.

As used herein, phrases such as "in some embodiments" or "in an embodiment" does not necessarily indicate the same embodiment of the disclosure.

Some embodiments of the disclosure may be represented by block components and various process operations. All or some of such functional blocks may be implemented by various numbers of hardware and/or software components which perform specific functions. For example, functional blocks of the disclosure may be implemented by using one or more processors or microprocessors or circuit elements for a specific function. For example, functional blocks may also be implemented using various programming or scripting languages. Functional blocks may be implemented as an algorithm executed in one or more processors. Furthermore, the disclosure may employ related art techniques for electronics configuration, signal processing, and/or data processing, etc. Terms such as a module, a component, etc., may be used broadly and may not be limited to mechanical and physical elements.

Connecting lines or connecting members between elements shown in the drawings are intended to merely illustrate functional connections and/or physical or circuit connections. In an actual device, connections between elements may be indicated by replaceable or added various functional connections, physical connections, or circuit connections.

Throughout the disclosure, expressions such as 'at least one of A, B [and/or] C' may indicate any one of 'only A', 'only B', 'only C', 'both A and B', 'both A and C', 'both B and C', and 'all of A, B, and C'.

In addition, herein, components expressed as '~unit', 'module', etc., may be made by combining two or more components into one component, or one component may be divided into two or more components based on divided functions. Moreover, each component to be described below may additionally perform all or some of functions managed by another component in addition to a main function managed by the component, and a partial function of the main function managed by each component may be performed by another component.

In addition, in the present specification, an 'image' or a 'picture' may correspond to a still image, a moving image including a plurality of continuous still images (or frames), or video.

In an embodiment of the disclosure, a display apparatus may refer to any electronic device capable of receiving an image signal and visually outputting a corresponding image. More specifically, the display apparatus may refer to any electronic device capable of receiving an image signal corresponding to content the user desires to view and visually outputting a corresponding image. According to another embodiment, the display apparatus may be an image processing device (such as a set-top box, an audio/video receiver, a media streaming device, etc.) that outputs an image for display on an external device.

By way of example, in an embodiment of the disclosure, a display apparatus may include a television (TV), a digital TV, a smart TV, a digital signage, a digital sign, a smartphone, a tablet personal computer (PC), a personal digital assistant (PDA), a laptop computer, a media player, etc.

Hereinbelow, with reference to the attached drawings, a display apparatus and an operating method thereof according to one or more embodiments is be described in detail. In the attached drawings, the same component is indicated by the same reference numeral. Throughout the entire detailed description, the same component may be referred to with the same term.

A display apparatus according to an embodiment may be an electronic device that receives a content list from a content provider and receives and reproduces image data corresponding to at least one content included in the content list. The display apparatus may include the content providing application corresponding to the content provider. Herein, 'include' may mean that the content providing application (specifically, a program for executing the content providing application or a set of at least one instruction for executing the content providing application) is installed and stored in the display apparatus.

Hereinbelow, with reference to the attached drawings, a display apparatus and an operating method thereof according to one or more embodiments is described in detail.

FIG. 1 is a diagram for describing a display apparatus 100 to which content is provided from a content provider 150. In FIG. 1, illustration and description is using an example in which a display apparatus 100 is a TV, although it is understood that one or more other embodiments are not limited thereto.

Referring to FIG. 1, a server 150 is provided as an example of a content provider. The server 150 may be a moving image service provider for providing moving images such as movies, dramas, music videos, etc., to a user. The server 150 may be referred to as a 'content provider', a 'moving image service provider', etc.

The display apparatus 100 may be provided with content from the server 150 by communicating with the server 150. The display apparatus 100 may be provided with information about at least one content retained (or stored) by the server 150, before the display apparatus 100 is provided with content from the server 150. Herein, information about content may include various information related to the content such as additional information about the content, a thumbnail of the content, information about a producer of the content, etc. For example, the additional information about the content may include i) a resolution of the content, ii) a title of the content (e.g., when the content is a movie, the tile of the content is a title of the movie), iii) information about a character or an actor appearing in the content, iv)

information about a synopsis, a summary, a theme, etc., of the content, v) information about a background or a place appearing in the content, etc. The information about the content may include various information related to or describing the content in addition to the above-described examples.

Hereinafter, for convenience of description, the above-described information about the content will be referred to as 'content-related information'.

The content-related information may be information corresponding to specific content. However, a plurality of pieces of content-related information respectively corresponding to a plurality of contents may be grouped and referred to as 'content-related information'.

The display apparatus 100 may be configured to display a high-quality image. More specifically, the display apparatus 100 is configured to display a high-resolution image. For example, a display apparatus capable of implementing a resolution of 8K may be provided.

Moreover, to satisfy a user's demand for viewing high-quality content, a content provider may obtain high-resolution content and provide the same to the display apparatus 100. However, when a resolution of an image (e.g., a moving image) forming content increases, an information throughput required for processing the high-resolution image may increase. Herein, processing of the image may include encoding and/or decoding and transmitting the image. Thus, methods of efficiently processing a high-resolution image are developed.

As described above, as a method of efficiently processing a high-resolution image, a scaling technique using artificial intelligence (AI) is provided. Hereinbelow, for convenience of description, the scaling technique using AI will be referred to as an 'AI scaling technique'. Herein, scaling may mean adjusting a resolution that is the size of the image. More specifically, the AI scaling technique may mean a technique for adjusting a size or resolution of an image that is input using a neural network according to an AI technique. AI ScaleNet of SAMSUNG may be an example of AI scaling techniques. More specifically, AI ScaleNet has the same compression performance with a half bitrate when compared to a reference codec, through preprocessing and postprocessing based on deep learning, while using a standard codec. Herein, preprocessing may include encoding processing and postprocessing may include decoding processing.

Reducing a resolution or processing to reduce a resolution may be referred to as down-scaling. Increasing a resolution or processing to increase a resolution may be referred to as up-scaling. In an embodiment, 'AI downscaling' may mean processing to reduce a resolution of an image based on AI, and 'encoding' may mean encoding using image compression based on frequency conversion. In addition, 'decoding' may mean decoding using image reconstruction based on frequency conversion, and 'AI upscaling' may mean processing to increase a resolution of an image based on AI.

Hereinbelow, for convenience of a description, the scaling technique using AI may be referred to as an 'AI codec'.

In an embodiment, a plurality of contents provided by the server 150 may include content of a resolution that is adjusted using the AI scaling technique. More specifically, the server 150 may save a resource (e.g., a memory, bandwidth, computational complexity/time, etc.) required for storing, transmitting, and/or processing content by storing downscaled content. By transmitting the downscaled content to the display apparatus 100, the server 150 may increase a data transmission rate and minimize a resource (e.g., a bandwidth of a network, etc.) required for data transmission.

In FIG. 1, an example is shown where the server 150 stores two AI-downscaled contents 151, 152. For example, the server 150 may include first content 151 with a resolution of 4K, generated by downscaling content of a resolution of 8K using the AI codec, and second content 152 with a resolution of 2K, generated by downscaling content of a resolution of 4K (or generated by downscaling the content of the resolution of 8K) using the AI codec. The server 150 may provide a content list 155 of contents retained by the server 150 to the display apparatus 100. Herein, items included in the content list 155 may include information about the first content 151 and information about the second content 152. More specifically, the content list 155 may include resolution information corresponding to each content. For example, the information about the first content 151 may be referred to as first content-related information, and may include a resolution of the first content 151. When the first content 151 is downscaled, a downscaled resolution (in the foregoing example, 4K) may be included in the first content-related information. The information about the second content 152 may be referred to as second content-related information, and may include a resolution of the second content 152. When the second content 152 is downscaled, a downscaled resolution (in the foregoing example, 2K) may be included in the second content-related information.

In addition, the server 150 may store at least one non-downscaled content that is not downscaled. Hereinbelow, for convenience of a description, the non-downscaled content will be referred to as 'general content' or 'original content'.

In an embodiment, the display apparatus 100 may support upscaling. More specifically, the display apparatus 100 may perform processing according to the AI codec to upscale a resolution. In this case, the display apparatus 100 may receive an image signal that is downscaled according to the AI codec, decode the received image signal, and perform AI upscaling to obtain a high-resolution image.

When the display apparatus 100 supports upscaling, the first content 151 received from the server 150 may be upscaled to a resolution of 8K in the display apparatus 100. That is, the display apparatus 100 may generate the upscaled first content 151. Thus, the display apparatus 100 may receive content having a resolution of 4K (more specifically, the first content 151) and upscale the received content to display content having a resolution of 8K. The second content 152 received from the server 150 may be upscaled to a resolution of 4K in the display apparatus 100. That is, the display apparatus 100 may generate the upscaled second content 152. Thus, the display apparatus 100 may receive content having a resolution of 2K (more specifically, the second content 152) and upscale the received content to display content having a resolution of 4K.

In addition, there may be a display apparatus 110 that does not support upscaling. In this case, the display apparatus 110 may not be able to AI-upscale an image signal processed according to the AI codec. Thus, the first content 151 received from the server 150 may be decoded and output at a resolution of 4K without being upscaled to a resolution of 8K in the display apparatus 110. Thus, the second content 152 received from the server 150 may be output at a resolution of 2K without being upscaled to a resolution of 8K in the display apparatus 110.

Hereinbelow, with reference to FIGS. 2, 9, and 10, an AI codec technique according to an embodiment is described in detail. Terms related to the AI codec technique according to an embodiment may be defined as below.

Herein, a 'deep neural network (DNN)' may be a representative example of an artificial neural network model simulating a cranial nerve, and may not be limited to an artificial neural network model using a specific algorithm.

Furthermore, herein, a 'parameter' may be a value used in an operation of each of layers constituting a neural network, and may include a weight value used in application of an input value to a specific operation expression. The parameter may also be expressed in the form of a matrix. The parameter, which is a value set as a result of training, may be updated through separate training data.

Herein, a 'first DNN' may mean a DNN used for AI-downscaling an image, and a 'second DNN' may mean a DNN used for AI-upscaling an image.

Herein, 'DNN configuration information' may include a parameter described above as information related to an element forming a DNN. By using the DNN configuration information, the first DNN or the second DNN may be configured.

Herein, an 'original image' may mean an image that is subject to AI encoding, and a 'first image' may mean an image obtained as a result of AI-downscaling the original image in an AI encoding process. In addition, a 'second image' may mean an image obtained through first decoding in an AI decoding process, and a 'third image' may mean an image obtained by AI-upscaling the second image in the AI decoding process.

Herein, 'AI downscaling' may mean processing to reduce a resolution of an image based on AI, and 'first encoding' may mean encoding using image compression based on frequency conversion. Further, 'first decoding' may mean decoding using image reconstruction based on frequency conversion, and 'AI upscaling' may mean processing to increase the resolution of an image based on AI.

Figure 2:
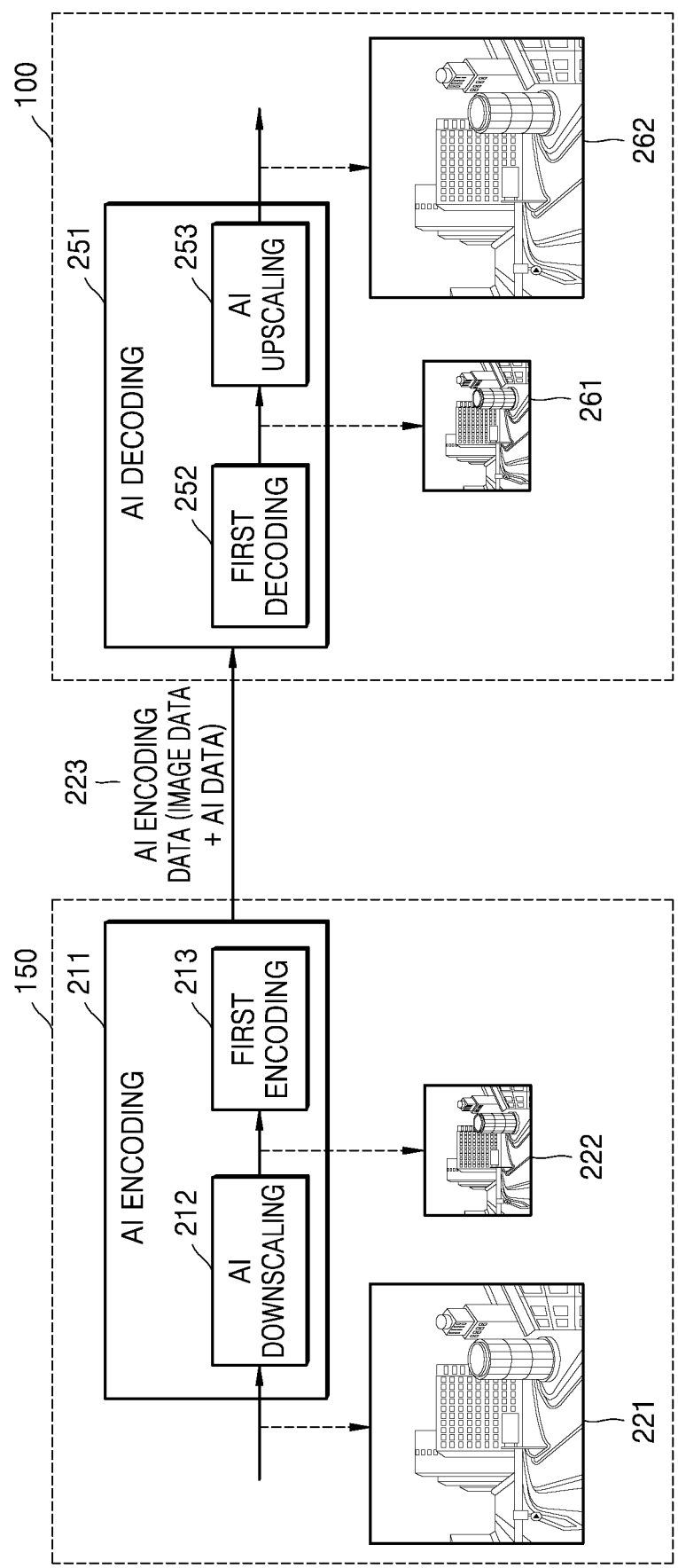
FIG. 2 is a diagram for describing content provided from a content provider.

FIG. 2 is a diagram for describing content provided from a content provider 150 according to an embodiment. More specifically, FIG. 2 is a diagram for describing an AI encoding process and an AI decoding process according to the AI codec. In FIG. 2, the same components as in FIG. 1 are indicated by the same reference numerals and an overlapping description thereof may be omitted below.

The server 150 may store AI-downscaled content and transmit the same to the display apparatus 100. Herein, the server 150 may receive the AI-downscaled content from outside and store the same. For example, when an external content producer exists separately from the server 150, the external content producer may generate AI-downscaled content and transmit the same to the server 150. The server 150 may receive and store the AI-downscaled content.

Alternatively, the server 150 may directly perform AI downscaling and store correspondingly generated AI-downscaled content. In FIG. 2, a case where the server 150 performs AI downscaling is described and illustrated.

Referring to FIG. 2, AI downscaling may be performed in the server 150 and AI upscaling may be performed in the display apparatus 100.

Referring to FIG. 2, the server 150 may perform AI-downscaling 212 on a high-resolution original image 221 to obtain a first image 222. By performing first encoding 213 and first decoding 252 on the first image 222 having a lower resolution than the original image 221, a bitrate to be processed may be largely reduced when compared to performing first encoding 213 and first decoding 252 on the original image 221.

For convenience of a description, in FIG. 2, a component for performing AI downscaling is illustrated as an AI encoder 211 and a component for performing AI upscaling is illustrated as an AI decoder 251.

For example, in an AI encoding process, the first image 222 may be obtained by performing AI-downscaling 212 on the original image 221, and first encoding 213 may be performed on the first image 222. In an AI decoding process, AI encoding data 223 obtained as a result of AI encoding, which includes AI data and image data, may be received, a second image 261 may be obtained through first decoding 252, and AI upscaling 253 may be performed on the second image 261 to obtain a third image 262.

In the AI encoding process, upon input of the original image 221, AI downscaling 212 may be performed on the original image 221 to obtain the first image 222 having a specific resolution or quality. AI downscaling 212 may be performed based on AI, whereby AI for AI downscaling 212 is jointly trained with AI for AI upscaling 253 of the second image 261. This is because when AI for AI downscaling 212 and AI for AI upscaling 253 are separately trained, a difference between the original image 221 that is subject to AI encoding and the third image 262 reconstructed through AI decoding increases.

In an embodiment of the disclosure, to maintain such a joint relationship in the AI encoding process and the AI decoding process, AI data may be used. Thus, the AI data obtained through the AI encoding process includes information indicating an upscaling target, and in the AI decoding process, AI upscaling 253 is performed on the second image 261 according to the upscaling target identified based on the AI data.

AI for AI downscaling 212 and AI for AI upscaling 253 may be implemented using a DNN. That is, AI downscaling 212 may include a first DNN and perform downscaling by performing an operation through a DNN. AI upscaling 253 may include a second DNN and perform upscaling by performing an operation through a DNN.

The first DNN and the second DNN are jointly trained through sharing of loss information under a specific target, such that the server 150, which is an AI encoding apparatus, may provide target information used in joint training between the first DNN and the second DNN to the display apparatus 100 that is an AI decoding apparatus which may perform AI upscaling 253 at a targeting resolution on the second image 261 based on the provided target information.

In the first encoding 213 and first decoding 252, the amount of information of the first image 222 having undergone AI downscaling 212 from the original image 221 may be reduced through first encoding 213. First encoding 213 may include generating predicted data by predicting the first image 222, generating residual data corresponding to a difference between the first image 222 and the predicted data, transforming the residual data, which is a spatial-domain component, into a frequency-domain component, quantizing the residual data transformed into the frequency-domain component, and entropy-encoding the quantized residual data. This first encoding 213 may be implemented by one of image compression methods using frequency conversion, such as Moving Picture Experts Group (MPEG)-2, H.264 advanced video coding (AVC), MPEG-4, high efficiency video coding (HEVC), VC-1, VP8, VP9, AOMedia video 1 (AV1), etc.

The second image 261 corresponding to the first image 222 may be reconstructed through first decoding 252 of the image data. First decoding 252 may include generating quantized residual data by performing entropy-decoding on image data, inverse-quantizing the quantized residual data, transforming residual data of a frequency-domain component into a spatial-domain component, generating predicted data, and reconstructing the second image 261 by using the predicted data and the residual data. Such first decoding 252 may be implemented by an image reconstruction method corresponding to one of image compression methods using frequency conversion, such as MPEG-2, H.264, MPEG-4, HEVC, VC-1, VP8, VP9, AV1, etc., used in first encoding 213.

The AI encoding data obtained through the AI encoding process may include image data obtained as a result of first encoding 213 of the first image 222 and AI data related to AI downscaling 212 of the original image 221. The image data may be used in first decoding 252, and the AI data may be used in AI upscaling 253.

The image data may be transmitted in the form of a bitstream. The image data may include data obtained based on pixel values in the first image 222, e.g., residual data that is a difference between the first image 222 and predicted data of the first image 222. The image data may include information used in first encoding 213 of the first image 222. For example, the image data may include prediction mode information used in first encoding 213 of the first image 222, motion information, quantization parameter information used in first encoding 213, etc. The image data may be generated according to rules, e.g., a syntax, of the image compression method used in first encoding 213 among image compression methods using frequency conversion such as MPEG-2, H.264 AVC, MPEG-4, HEVC, VC-1, VP8, VP9, AV1, etc.

The AI data may be used in AI upscaling 253 based on the second DNN. As described above, the first DNN and the second DNN are jointly trained, such that the AI data may include information that enables AI upscaling 253 of the second image 261 to be accurately performed through the second DNN. In the AI decoding process, AI upscaling 253 may be performed at a targeting resolution and/or quality on the second image 261 based on the AI data.

The AI data may be transmitted, together with the image data, in the form of a bitstream. Alternatively, depending on implementation, the AI data may be transmitted separately from the image data, in the form of a frame or a packet. The image data and the AI data, which are obtained as a result of AI encoding, may be transmitted through an identical network or different networks.

As described above with reference to FIG. 2, content used in an embodiment, which is to be downscaled and/or upscaled, may be generated through AI encoding and AI decoding according to the AI codec.

An embodiment provides a display apparatus and an operating method thereof, whereby information about a resolution of content generated using the AI codec may be accurately and quickly classified, and final resolution information based on the classification may be provided to a user, as is described in detail below with reference to FIGS. 3, 4A, 4B, 5A through 5C, 6A, 6B, 7A, 7B, and 8 through 11.

Figure 3:
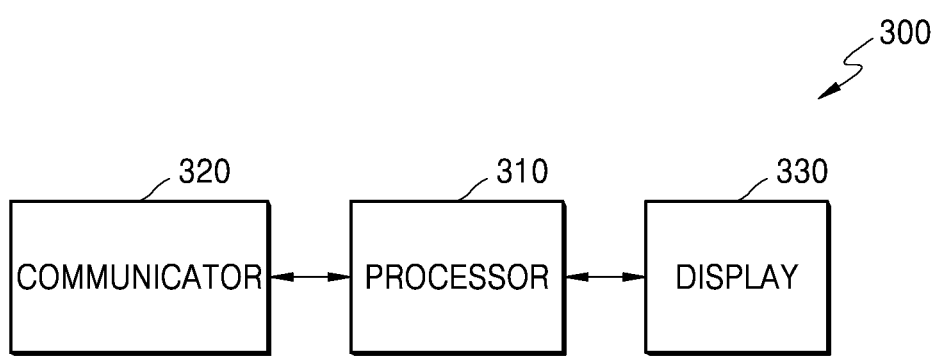
FIG. 3 is a block diagram of a display apparatus according to an embodiment.

FIG. 3 is a block diagram of a display apparatus 300 according to an embodiment. The display apparatus 300 illustrated in FIG. 3 may correspond to the display apparatus 100 described above with reference to FIGS. 1 and 2. Thus, in describing the display apparatus 300 of FIG. 3, a description overlapping with that made with reference to FIGS. 1 and 2 may be omitted below.

Referring to FIG. 3, the display apparatus 300 according to an embodiment may include a display 330, a communicator 320 communicating with a server, and a processor 310 executing at least one instruction.

The server communicating with the communicator 320 may be the server 150, described above with reference to FIGS. 1 and 2, for providing content.

In an embodiment, the processor 310 may control the communicator 320 to transmit resolution information of the display apparatus 300 and a transmission request for content-related information to the server. The processor 310 may receive information corresponding to the transmission request, specifically, the content-related information, from the server through the communicator 320. The processor 310 may also obtain a final resolution by classifying a resolution of content included in the received content-related information based on whether the display apparatus 300 supports upscaling. The processor 310 may control a screen providing information about content, which includes the final resolution, to be displayed through the display 330.

The transmission request transmitted to the server under control of the processor 310 may be generated corresponding to or based on a user input.

For example, when a user desires to watch a movie, the user may request the display apparatus 300 to execute the NETFLIX application. Upon execution of the NETFLIX application, the user may input a user input to request providing of information about particular content, to the display apparatus 300 (more specifically, the NETFLIX application). More specifically, when the user desires to watch the movie 'Frozen', the user may manipulate a user interface screen of the NETFLIX application to search for Frozen. Then, the NETFLIX application may transmit a transmission request corresponding to the user input, i.e., a transmission request for content (more specifically, the movie 'Frozen')-related information, which is information about the movie 'Frozen', to the server. Herein, the NETFLIX application may be included in the processor 310.

In another example, when the user desires to watch a movie, the user may request the display apparatus 300 to execute the NETFLIX application. Upon execution of the NETFLIX application, the user may input the user input for requesting providing of a list of content available to the display apparatus 300 (more specifically, the NETFLIX application). More specifically, the user may input a user input for requesting providing of a list of available movies, through a user interface screen of the NETFLIX application. Then, the NETFLIX application may transmit a transmission request corresponding to the user input, i.e., a transmission request for a list of providable contents, to the server.

That is, the transmission request transmitted to the server in response to the user input may include a transmission request for information about specific content or a transmission request for a content list. Herein, the content list may be a list of all contents providable in the server. Alternatively, the content list may be a list of at least one content having a particular resolution among all of the contents retained by the server.

First, a description is provided below using an example where the transmission request transmitted to the server under control of the processor 310 is a transmission request for content-related information, i.e., a transmission request for information about particular content (specifically, user-selected content).

More specifically, the processor 310 may determine whether to classify a resolution of content downscaled using a first scheme as a higher resolution, based on whether the display apparatus 300 supports upscaling. A final resolution may be obtained based on the determination.

In particular, when the display apparatus 300 supports upscaling, the processor 310 may obtain the final resolution by classifying the resolution of the content (specifically, the resolution of the content downscaled using the first scheme when the content is downscaled using the first scheme), included in the content-related information, as the higher resolution. The processor 310 may provide information including the obtained final resolution to the user.

Further, when the display apparatus 300 supports upscaling using a second scheme corresponding to the first scheme, the processor 310 may classify the resolution of the content downscaled using the first scheme as the higher resolution. The first scheme and the second scheme may be schemes jointly trained according to an AI codec. More specifically, when the original data is downscaled using the first scheme to generate downscaled data, the downscaled data may be upscaled to the original data by using the second scheme.

When the display apparatus 300 does not support upscaling using the second scheme corresponding to the first scheme, the processor 310 may obtain the same value as the resolution of the content downscaled using the first scheme as the final resolution.

In this case, when the display apparatus 300 does not support upscaling using the second scheme corresponding to the first scheme, the processor 310 may obtain the same value as the resolution of the content downscaled using the first scheme, as the final resolution.

Herein, the higher resolution may mean a resolution prior to downscaling of the content using the first scheme.

In an embodiment, the first scheme may be classified according to a detailed method of performing downscaling. For example, the first scheme may be a scheme to downscale a resolution through AI encoding described above with reference to FIGS. 1 and 2. The second scheme may be classified according to a detailed method of performing upscaling. For example, the second scheme may be a scheme to upscale a resolution through AI decoding described above with reference to FIGS. 1 and 2.

The first scheme and the second scheme may be schemes jointly trained according to an AI codec. More specifically, a difference between an image before being downscaled (e.g., the original image 221 of FIG. 2) and an image after being upscaled (e.g., the third image 262 reconstructed through AI decoding in FIG. 2) may be less than or equal to a reference limit, when AI downscaling using the first scheme and AI upscaling using the second scheme are jointly trained. That is, content downscaled using the first scheme may be upscaled using the second scheme.

For example, like the first content 151 described with reference to FIG. 1, when 4K content is generated by downscaling content of a resolution of 8K, a resolution of the downscaled content may be 4K. The higher resolution may be 8K. When the display apparatus 300 supports upscaling, the resolution of the downscaled content may be classified as content group corresponding to the higher resolution, 8K. The content-related information transmitted to the display apparatus 300 from the server may include the resolution of the first content 151. In the foregoing example, the content-related information corresponding to the first content may include the resolution of the first content 151, 4K.

Herein, the server may be a content provider. For example, the server may be a moving image service provider for providing moving images such as movies, dramas, music videos, etc., to a user. The server may be an intermediate server that relays communication between the content provider and a display apparatus. In an embodiment, the server generates downscaled content by performing downscaling, and transmits corresponding image data to the display apparatus 300.

The processor 310 may control an intended operation to be performed, by executing at least one instruction. Herein, the at least one instruction may be stored in an internal memory included in the processor 310 or a memory included in the display apparatus 300 separately from the processor 310.

The processor 310 may control at least one component included in the display apparatus 300 to perform an intended operation, by executing the at least one instruction. Thus, even when a description is made with reference to an example where the processor 310 performs specific operations, it may be understood that the processor 310 controls the at least one components included in the display apparatus 300 to perform the specific operations.

In an embodiment, when the display apparatus 300 supports upscaling, the processor 310 may include at least one of at least one instruction for performing upscaling, a processor for executing the at least one instruction, or a module for performing upscaling. The module or processor for performing upscaling may be included in the display apparatus 300 separately from the processor 310. For example, the processor 310 may include a module for performing upscaling, e.g., the AI decoder 251 described with reference to FIG. 2.

The processor 310 may include a DNN (more specifically, the second DNN) that receives image data corresponding to content, upscales a resolution of the image data, and outputs the image data with the upscaled resolution.

In the display apparatus 300 supporting upscaling, the processor 310 may classify the resolution of the content as the higher resolution when the content-related information received from the server corresponds to the content downscaled using the first scheme. That is, in the example described above with reference to FIG. 1, when the content-related information received from the server corresponds to the first content 151, the content-related information may include 4K as the resolution of the first content, and the processor 310 may classify a resolution corresponding to the received content-related information as 8K rather than 4K. This is because the display apparatus 300 supporting upscaling may increase a resolution of 4K to a resolution of 8K by performing upscaling (i.e., AI upscaling) on the downscaled first content. Thus, when the display apparatus 300 supports upscaling, the processor 310 may obtain 8K as the resolution of the first content.

In an embodiment, the processor 310 may transmit the resolution information of the display apparatus 300 and the transmission request for the content list to the server. That is, the transmission request for the content-related information may include the transmission request for the content list. More specifically, when (or based on) the user input for requesting providing of the content list is received in the display apparatus 300, the processor 310 may control the communicator 320 to transmit the transmission request for the content list to the server. Then, the content list corresponding to the transmission request for the content list may be received from the server. When the display apparatus 300 supports upscaling, the processor 310 may classify a resolution of the content downscaled using the first scheme among a plurality of contents included in the content list as content corresponding to the higher resolution and generate a final content list.

In particular, the processor 310 may generate a final content list on which a final resolution corresponding to each of at least one content included in the content list is displayed. That is, the final content list generated in the processor 310 may include a final resolution corresponding to each content.

In the display apparatus 300 supporting upscaling, the processor 310 may classify the resolution of the content downscaled using the first scheme among the plurality of contents included in the content list received from the server, as the content corresponding to the higher resolution.

In addition, when first content among a plurality of contents retained by the server includes content downscaled using the first scheme, the content list received by the communicator 320 may include information indicating that the first content is the downscaled content.

The display 330 may output an image on the screen. That is, to allow the user to visually recognize an image corresponding to content, the display 330 may output the image through a display panel included therein or connected thereto.

The processor 310 may include a memory that stores image data input from the outside of the display apparatus 300 or is used as a storage region corresponding to various tasks performed in the display apparatus 300, and at least one processor.

The processor 310 may include a RAM that stores a signal or data input from the outside of the display apparatus 300 or is used as a storage region corresponding to various tasks performed by the display apparatus 300, a ROM having stored therein a control program and/or a plurality of instructions for controlling the display apparatus 300, and at least one processor. The processor may include a graphic processing unit (GPU) for processing data used to generate an image signal or an image. Herein, 'processing' may mean performing at least one of receiving, converting (specifically, converting a format, a size, and/or a feature, etc.), generating, or processing an image by using a signal or data.

The processor may be implemented as a system on chip (SoC) in which a core and a GPU are integrated. The processor 310 may also include a multi-core beyond a single core. For example, the processor 310 may include a dual core, a triple core, a quad core, a hexa core, an octa core, a deca core, a dodeca core, a hexadecimal core, etc.

In an embodiment, the display apparatus 300 may provide a moving image service through a particular content provider. In this case, the display apparatus 300 may install a content providing application corresponding to the particular content provider via the processor 310 and perform transmission of the transmission request for the content list, reception of the content list, and generation of the final content list through the installed content providing application. Herein, installation of the content providing application in the processor 310 may mean storing a program corresponding to the content providing application in the processor 310.

More specifically, the processor 310 may execute at least one instruction for executing the content providing application. For example, the content providing application may be installed in the processor 310. For example, the content providing application may be the NETFLIX application, the PRIME VIDEO application, etc. In an embodiment, upon receipt of an execution request for the content providing application from the user, the processor 310 may control the content providing application to be executed to allow the user to be provided with a moving image service. Then, the content providing application may transmit the resolution information of the display apparatus and the transmission request for the content list to the server, receive the content list corresponding to the transmission request for the content list from the server, classify the resolution of the content downscaled using the first scheme among the plurality of contents included in the content list as the content corresponding to the higher resolution when the display apparatus supports upscaling, and generate the final content list.

That is, in an embodiment, transmission of the content-related information or the transmission request for the content list, reception of the content-related information or the content list, and obtaining of the final resolution, which are described above as being performed by the processor 310, may also be performed by the content providing application.

Hereinbelow, for convenience of description, an example is described in which the processor 310 performs transmission of the content-related information or the transmission request for the content list, reception of the content-related information or the content list, and obtaining of the final resolution.

The display 330 may output an image on the screen. More specifically, the display 330 may output an image corresponding to video data through an internally included display panel or through an external display panel to allow the user to visually recognize the video data.

For example, the display 330 may output an image corresponding to received content. Thus, the user may watch the content through the display 330.

The display 330 may display a user interface screen of the content providing application. Herein, the user interface screen may include a screen including the content-related information, a screen including the content list, a screen allowing the user to search for content, etc.

The communicator 320 may perform communication with an external device (e.g., a server) through at least one wired or wireless communication network. Herein, the external device may be a server that provides content displayed by the display apparatus 300, an electronic device that provides content, etc. For example, the external device, which is a device capable of transmitting specific content to the display apparatus 300, may include a broadcasting station server, a content provider server, a content storage device, etc. Hereinbelow, an example is described where the external device communicating with the communicator 320 is a server of the content provider (the server 150 of FIG. 1).

The communicator 320 may include at least one communication module such as a short-range communication module, a wireless communication module, a mobile communication module, a broadcasting reception module, etc. Herein, at least one communication module may mean a tuner that performs broadcasting reception or a communication module capable of performing data transmission/reception through a network complying with communication standards such as Bluetooth, wireless local area network (WLAN), Wireless Fidelity (WiFi), Wireless Broadband (WiBro), World Interoperability for Microwave Access (WiMax), code divisional multiple access (CDMA), wideband CDMA (WCDMA), the Internet, third-generation (3G), fourth-generation (4G), and/or fifth-generation (5G), etc.

For example, the mobile communication module included in the communicator 320 may perform communication with another device (e.g., the server) located at a remote distance through the communication network complying with the communication standards such as 3G, 4G, and/or 5G, etc. Herein, the communication module communicating with the server located at a remote distance may be referred to as a 'remote-distance communication module'.

Figure 4A:
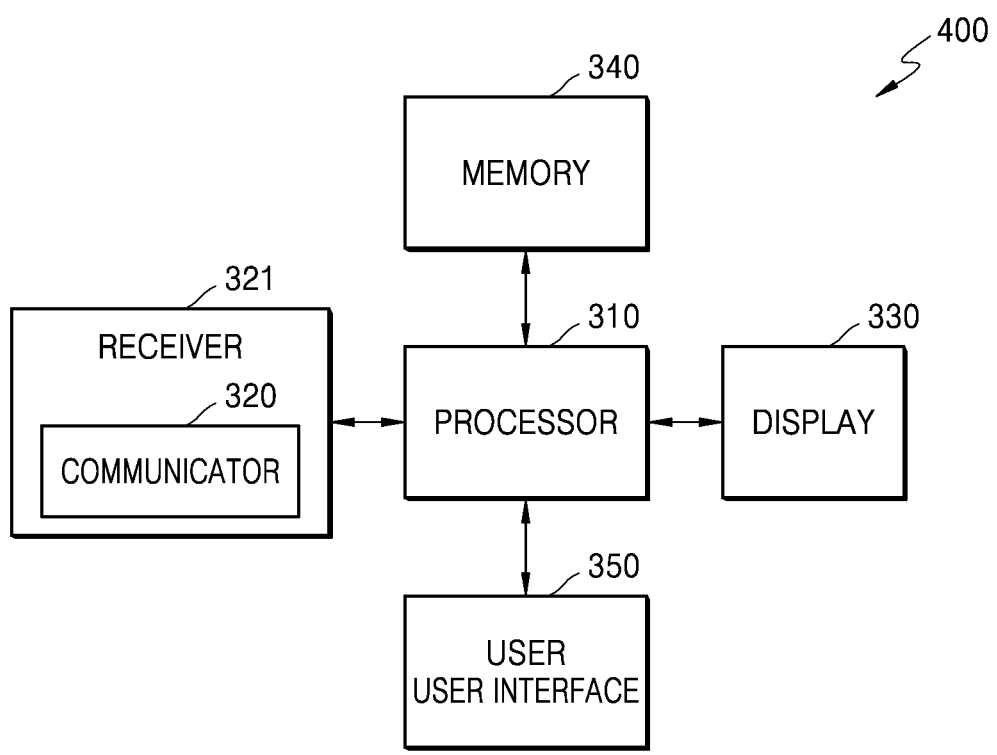
FIG. 4A is another block diagram of a display apparatus according to an embodiment.

FIG. 4A is another block diagram of a display apparatus 400, according to an embodiment.

A display apparatus 400 shown in FIG. 4A may correspond to the display apparatus 300 illustrated in FIG. 3. Referring to FIG. 4A, the display apparatus 400 may further include at least one of a receiver 321, a memory 340, or a user interface 350, as compared to the display apparatus 300.

The receiver 321 may include the communicator 320 to receive and parse a signal or data received from the outside and may deliver the same to the processor 310. The receiver 321 may decode the parsed data. Herein, parsing and/or decoding operations performed by the receiver 321 may be performed by the processor 310. In the drawings and the detailed description, an example is described where the receiver 321 may parse and/or decode the received image data and deliver the same to the processor 310.

The memory 340 may store at least one instruction. More specifically, the memory 340 may store at least one instruction to be executed by the processor 310. The memory 340 may store at least one program to be executed by the processor 310.

The memory 340 may provide a memory region needed for or used by the processor 310 to perform a specific operation. For example, the processor 310 may perform generation and processing of an image by using at least one region in the memory 340.

The memory 340 may include a storage medium of at least one type of a flash memory type, a hard disk type, a multimedia card micro type, a card type memory (e.g., a secure digital (SD) or extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, or the like.

The memory 340 may store image data corresponding to content received through the communicator 320.

The user interface 350 may receive a user input for controlling the display apparatus 400. The user interface 350 may include, but is not limited to, a user input device including a touch panel that detects a user's touch, a button that receives user's push manipulation, a wheel that receives user's rotation manipulation, a keyboard, a dome switch, etc.

The user interface 350 may include a voice recognition device for voice recognition. For example, the voice recognition device may be a microphone and may receive a user's voice command or voice request. Thus, the processor 310 may control an operation corresponding to the voice command or the voice request to be executed.

The user interface 350 may include a motion detection sensor. For example, the motion detection sensor may detect motion of the display apparatus 400 and receive the detected motion as a user input. The voice recognition device and the motion detection sensor may be included in the display apparatus 400 as a module independent of the user interface 350, rather than be included in the user interface 350.

Hereinbelow, with reference to FIGS. 5C, 6A, 6B, 7A, 7B, and 8, detailed operations performed by the display apparatus 300 or 400 are described in detail.

Figure 4B:
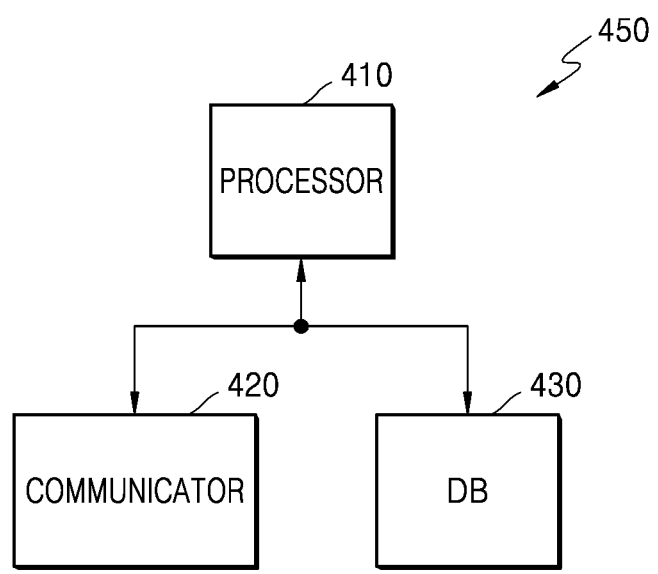
FIG. 4B is a block diagram of a server according to an embodiment.

FIG. 4B is a block diagram of a server 450, according to an embodiment. The server 450 shown in FIG. 4 may correspond to the server 150 described above with reference to FIGS. 1 and 2. Thus, when the server 450 is described, a description overlapping with that made with reference to FIGS. 1 and 2 may be omitted below.

Referring to FIG. 4B, the server 450 according to an embodiment may include a database (DB) 430, a communicator 420, and a processor 410.

The DB 430 may store at least one content. Herein, each content stored in the DB 430 may include image data. The DB 430 may store downscaled content. More specifically, the DB 430 may store content that is AI-downscaled using an AI codec. For example, the DB 430 may store the first content 151 and the second content 152 described above with reference to FIG. 1. The DB 430 may store at least one non-downscaled content (hereinbelow, 'general content' or 'original content').

The DB 430 may include a memory and store at least one of at least one content described above or at least one instruction, program, or data needed for or used by the server 450 to perform a particular operation, in the memory.

The DB 430 may store data needed for or used by the server 450 to perform an operation corresponding to a neural network. The DB 430 may include an AI encoding module that downscales content. The AI encoding module included in the DB 430 may correspond to the AI encoder 211 described above with reference to FIG. 2, and thus a redundant description thereof may be omitted below.

More specifically, the DB 430 may store a DNN (e.g., the first DNN) for performing AI downscaling. The DB 430 may store training data for training the DNN included therein. Thus, the processor 310 may train the DNN by using the training data stored in the DB 430.

The DNN included in the DB 430 may be a DNN transmitted after being trained in an external device or external server (or may be trained in the server 450). In this case, the DB 430 may not store training data.

When the server 450 receives downscaled content from the external device or the external server without performing downscaling on content and stores the downscaled content, the DB 430 may not include an AI encoding module.

The communicator 420 may include one or more components that enable communication with the display apparatus 100, 300, or 400. A detailed configuration of the communicator 420 may correspond to that of the communicator 320 described with reference to FIG. 3, and thus a redundant description thereof may be omitted below.

For example, the communicator 420 may include at least one communication module that performs communication with another device (e.g., the display apparatus 100, 300, or 400) located at a remote distance through a communication network complying with communication standards such as the Internet, 3G, 4G, and/or 5G, etc.

The processor 410 may generally control an overall operation of the server 450. For example, the processor 410 may generally control the DB 430 and the communicator 420 by executing at least one instruction and at least one of programs, stored in the DB 430 of the server 450.

The processor 410 may store at least one instruction and/or program for controlling an operation of the server 450. By executing at least one instruction and/or program included therein, the processor 410 may globally control the DB 430 and the communicator 420.

For example, the processor 410, by executing at least one instruction and at least one of programs, may perform at least one of downscaling content, receiving content-related information or a transmission request for a content list from the display apparatus 100, 300, or 400, transmitting the content-related information or the content list to the display apparatus 100, 300, or 400, or transmitting image data corresponding to particular content to the display apparatus 100, 300, or 400.

An operation of the server 450 is described in detail below with reference to FIG. 5C.

Figure 5A:
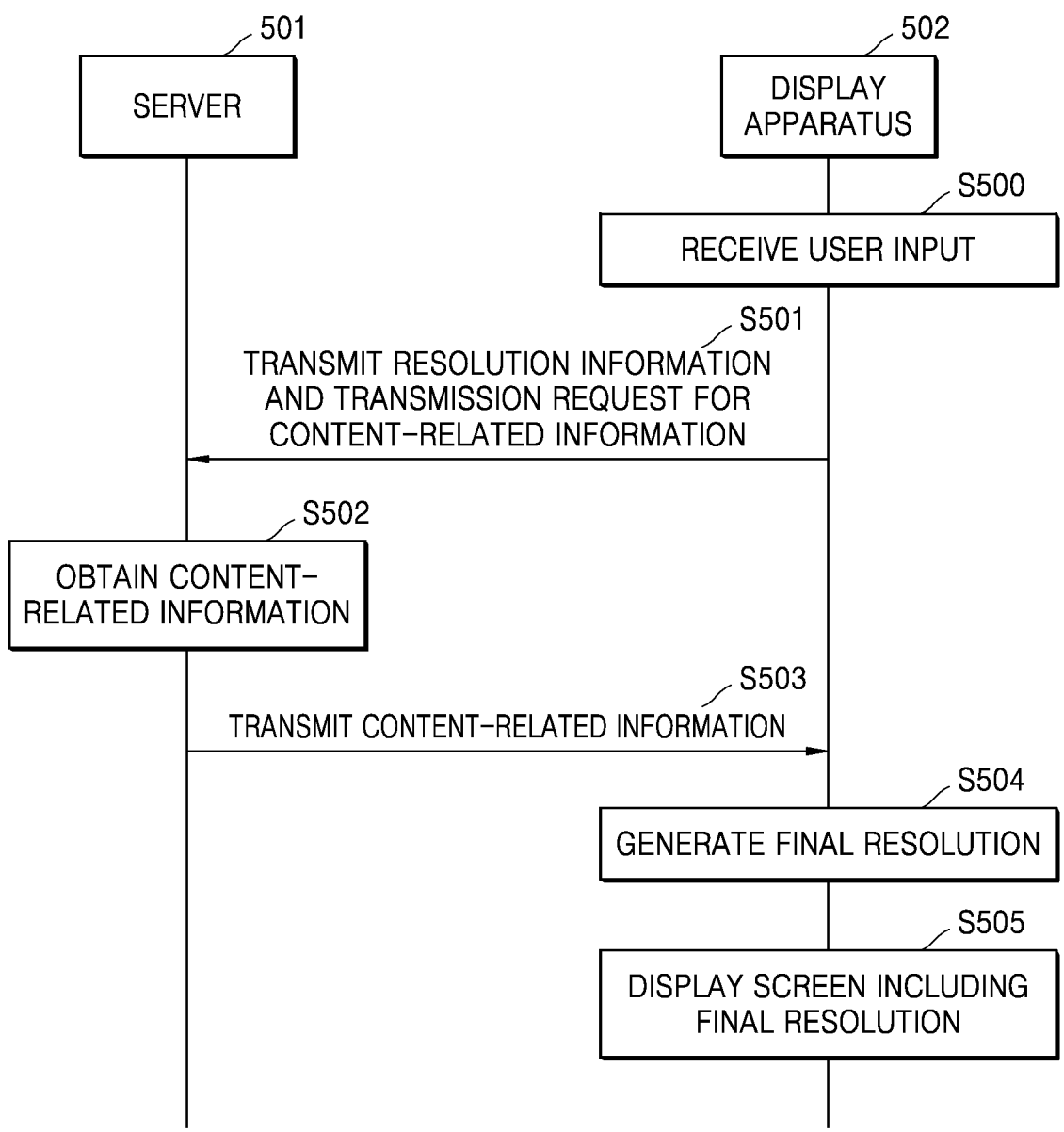
FIG. 5A is a diagram showing operations performed to provide content-related information, according to an embodiment.

FIG. 5A is a diagram showing operations performed to provide content-related information, according to an embodiment. In particular, FIG. 5A shows a method, performed by a display apparatus 502 communicating with a content-providing server 501, of providing content-related information including a final resolution of the content.

A server 501 and a display apparatus 502 shown in FIG. 5A may equally correspond to the server 150 or 450 and the display apparatus 100, 300, or 400 described above with reference to FIGS. 1 through 3, 4A, and 4B, such that in a description of operations shown in FIG. 5A, a description overlapping with that made with reference to FIGS. 1 through 3, 4A, and 4B may be omitted below.

For example, the server 501 may include the DB 430, the communicator 420, and the processor 410 shown in FIG. 4B. The display apparatus 502 may include the display 330, the communicator 320, and the processor 310 shown in FIG. 3.

Referring to FIG. 5A, the server 501 and the display apparatus 502 may communicate with each other through a wireless communication network. For example, the server 501 and the display apparatus 502 may communicate with each other through a communication network, etc., complying with an Internet communication network, 3G, 4G, 5G, and/or sixth-generation (6G), etc.

Referring to FIG. 5A, the display apparatus 502 may transmit resolution information thereof and a transmission request for content-related information to the server 501, in operation S501. Operation S501 may be performed by a communicator (320 of FIG. 3) under control of a processor (310 of FIG. 3) of the display apparatus 502.

The transmission request transmitted to the server 501 in operation S501 may be generated in response to receiving, by the processor (specifically, corresponding to the processor 310) included in the display apparatus 502, a user input in operation S500. That is, upon receipt of the user input to request providing of the content-related information in operation S500, the display apparatus 502 may perform operation S501. More specifically, when the user requests providing of information related to the movie 'Frozen', the display apparatus 502 may transmit a transmission request for the information related to the movie 'Frozen' to the server 501.

The resolution information transmitted in operation S501 may indicate resolution information of the display apparatus 502. For example, the resolution information may include a maximum resolution of an image output by the display apparatus 502. The resolution information may include information indicating whether the display apparatus 502 supports upscaling of a resolution. For example, the resolution information may include a flag indicating whether the display apparatus 502 supports AI upscaling.

The transmission request for the content-related information may include information about specific content that may be provided to the display apparatus 502 from the server 501. Herein, the specific content may be content selected or requested by the user. For example, the user may select any one content from a content list of contents that may be viewed through the NETFLIX application. The NETFLIX application installed in the display apparatus 502 may transmit the transmission request for the content-related information to the server 501 to provide the user with the content-related information that is information about content corresponding to the user input (or user's selection).

The transmission request for the content list may be a transmission request for a list of all contents retained by (or providable in connection with) the server 501 or a transmission request for a list of contents having a particular resolution.

For example, the user may desire to select and watch any one of the contents retained by (or providable in connection with) the server 501. Then, the user may input a user input to request displaying of the list of the contents retained by (or providable in connection with) the server 501 to the display apparatus 502. The display apparatus 502 may transmit the transmission request for the list of the contents retained by (or providable in connection with) the server 501 to the server 501, in response to the user input. The server 501 may transmit a list of contents that may be reproduced in the display apparatus 502 among providable contents thereof to the display apparatus 502. For example, when the display apparatus 502 supports a resolution of 4K as a maximum resolution, the server 501 may filter contents having a resolution of 4K or less among the providable contents and transmit a list of the filtered contents to the display apparatus 502. Then, the display apparatus 502 may obtain a final resolution for each content based on the content list received from the server 501 and generate and display a final content list including the obtained final resolution. Thus, the user may view the final content list and select desired content from among at least one content included in the final content list. Then, the display apparatus 502 may transmit a request for transmission of image data corresponding to the user-selected content to the server 501. The server 501 may transmit the requested image data to the display apparatus 502. Thus, the display apparatus 502 may display a screen corresponding to the user-selected content based on the received image data.

In another example, when the user desires to watch any one of contents corresponding to a particular resolution, the user may input a user input requesting displaying of a list of the contents corresponding to the particular resolution to the display apparatus 502. The display apparatus 502 may transmit a transmission request for the list of the contents corresponding to the particular resolution to the server 501, in response to the user input. The server 501 may transmit the list of the contents corresponding to the particular resolution among the providable contents to the display apparatus 502. Then, the display apparatus 502 may generate a final content list corresponding to the particular resolution, based on the content list received from the server 501, and display the generated final content list. Thus, the user may view the final content list and select desired content from among at least one content included in the final content list. Then, the display apparatus 502 may transmit a request for transmission of image data corresponding to the user-selected content to the server 501. The server 501 may transmit the requested image data to the display apparatus 502. Thus, the display apparatus 502 may display a screen corresponding to the user-selected content based on the received image data.

By way of another example, when the user desires to watch particular content, the user may input a user input for requesting displaying of a list (or a single item) corresponding to the particular content to the display apparatus 502. Then, the display apparatus 502 may transmit a transmission request for a content list to the server 501 in response to the user input. The server 501 may transmit a list of the particular content among the providable contents to the display apparatus 502. Herein, the list of the particular content may be a list of the particular contents having different resolutions. For example, the particular content may be the movie 'Frozen'. The server 501 may provide contents with a plurality of different resolutions for the movie 'Frozen'. For example, the server 501 may provide 'Frozen' with a resolution of 2K, 'Frozen' with a resolution of 4K, and 'Frozen' with a resolution of 8K. The maximum resolution of the display apparatus 502 may be 4K, for example. In this case, the server 501 may transmit a list including 'Frozen' with a resolution of 2K and 'Frozen' with a resolution of 4K to the display apparatus 502 (and not including 'Frozen' with a resolution higher than 4K).

In operation S501, the server 501 may obtain content-related information corresponding to the transmission request transmitted in operation S501. In particular, the server 501 may obtain the content-related information corresponding to the transmission request transmitted in operation S501, based on resolution information of the display apparatus 502 in operation S502. For example, the server 501 may obtain the content-related information corresponding to content of a resolution lower than or equal to the maximum resolution of the display apparatus 502, based on the resolution information of the display apparatus 502, in operation S502. Operation S502 may be performed under control of the processor (410 of FIG. 4B) of the server 501.

More specifically, when (or based on) a transmission request for first content-related information, which is information about first content, is transmitted in operation S501, and the first content retained by (or providable in connection with) the server 501 is content downscaled using the first scheme, the content-related information obtained in operation S502 may include information indicating that the first content is the downscaled content.

For example, the first content-related information regarding the first content 151 may include information about a title of the first content (e.g., a title of the movie, etc.), an image indicating the first content (e.g., a thumbnail image, a poster image of the movie, etc.), a running time of the first content, information indicating whether the first content is downscaled content (e.g., a flag indicating AI downscaling, etc.), a resolution of the first content (e.g., when the first content is downscaled according to an AI codec, a resolution after downscaling), a summary, a synopsis, or a theme of the first content, a character of the content, etc.

The server 501 may transmit content-related information corresponding to the received transmission request to the display apparatus 502 in operation S503. Operation S503 may be performed by a communicator (420 of FIG. 4B) under control of a processor (410 of FIG. 4B) of the server 501. Thus, the display apparatus 502 may receive the content-related information corresponding to the transmission request transmitted in operation S501 from the server.

In operation S504, the display apparatus 502 may obtain a final resolution by classifying a resolution of content included in the content-related information received in operation S503, based on whether the display apparatus 502 supports upscaling. Operation S504 may be performed by a communicator (310 of FIG. 3) of the display apparatus 502.

More specifically, it is assumed that the resolution of the first content included in the content-related information received in operation S503 is a first resolution and the first content is content downscaled using the first scheme. Then, in operation S504, when the display apparatus 502 supports upscaling using the second scheme corresponding to the first scheme, the first content may be classified as a content group corresponding to a second resolution higher than the first resolution (or the first content may be classified in both the content group corresponding to the second resolution and a content group corresponding to the first resolution). That is, the second resolution may be obtained as the final resolution of the first content. Conversely, when the display apparatus 502 does not support upscaling using the second scheme corresponding to the first scheme, the first content may be classified as a content group corresponding to the first resolution. Herein, the first resolution may mean a downscaled resolution. For example, when the first content is the first content 151 shown in FIG. 1, the first resolution may be 4K and the second resolution may be the original resolution of 8K before downscaling.

The display apparatus 502 may maintain the resolution of non-downscaled content. For example, for content which has the original resolution and exists in the server 501 without being downscaled, the resolution of the content may be classified as a resolution of 4K.

Operation S504 is described in more detail below with reference to FIGS. 7A and 7B.

The display device 502 may provide the final resolution obtained in operation S504 to the user. More specifically, the display apparatus 502 may display a screen providing information about content, which includes the final resolution obtained in operation S504, in operation S505. Operation S550 may be performed by a display (see the display 330 of FIG. 3) by the control of a processor (see the processor 310 of FIG. 3) of the display apparatus 502.

Figure 5B:
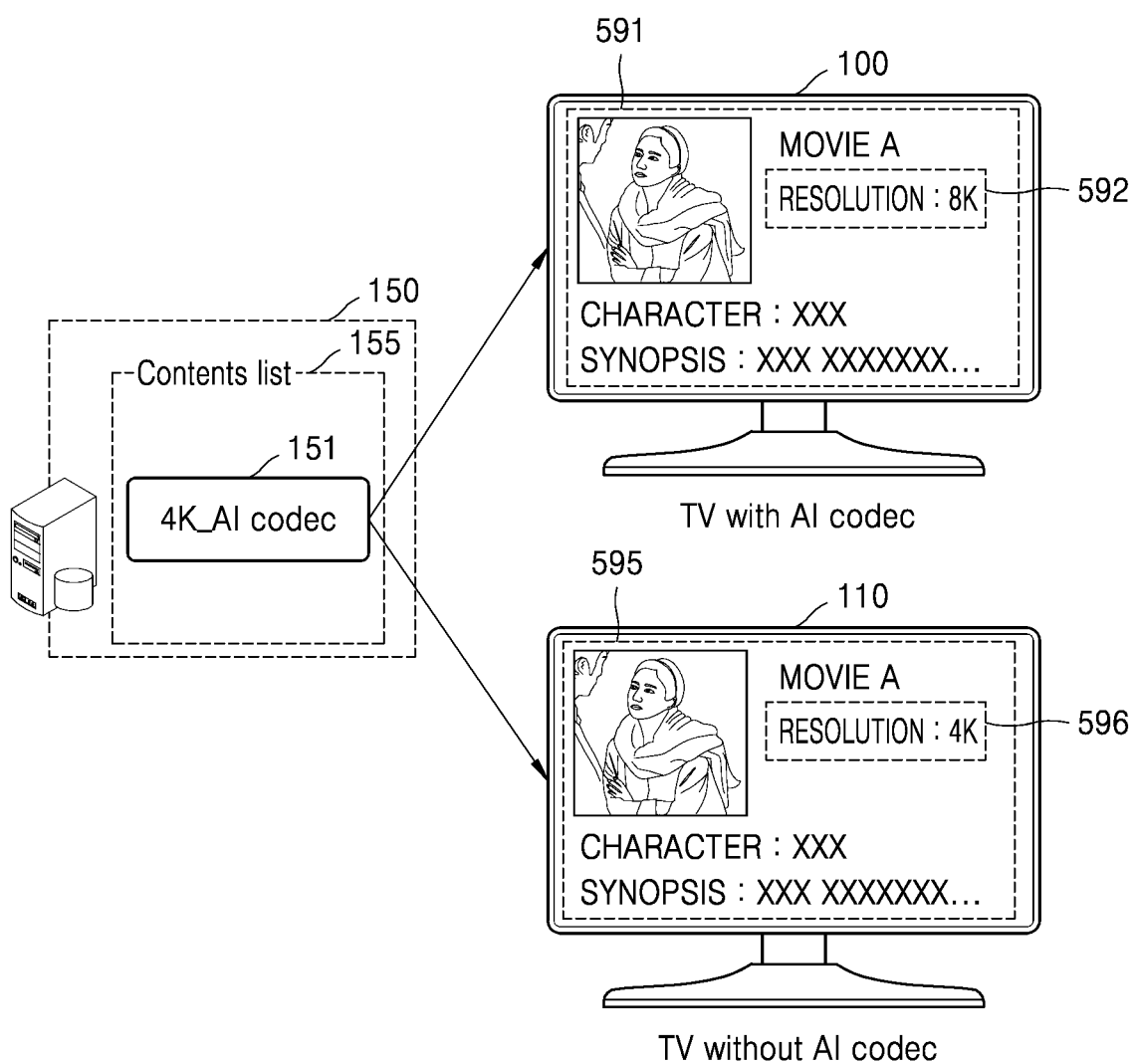
FIG. 5B is a view for describing information about content provided by a display apparatus, according to an embodiment.

FIG. 5B is a view for describing information about content provided by a display apparatus 100, 110, according to an embodiment. In particular, FIG. 5B shows a display apparatus 100, 110 that displays a screen including a final resolution obtained by performing the operations described with reference to FIG. 5A. In FIG. 5B, the same components as in FIG. 1 are illustrated using the same reference numerals.

Referring to FIG. 5B, a case is taken as an example in which the display apparatus 100 or 110 transmits, to the server 150 according to an AI codec (i.e., according to whether the display apparatus 100 or 110 includes an AI codec), a transmission request for first content-related information that is the information about the first content 151 having a resolution of 4K, generated through downscaling.

The display apparatus 100 supporting upscaling according to the AI codec may classify the resolution of the first content 151 as a resolution of 8K that is higher than 4K, thus obtaining a final resolution of 8K for the first content 151. Thus, the display apparatus 100 may display a screen 591 including content-related information including a final resolution of 8K 592 for the first content 151. In FIG. 5B, a case is taken as an example in which a poster image (or a thumbnail image), a movie title (e.g., 'Movie A'), characters, a resolution, and a summary of content are included in content-related information.

The display apparatus 110 that does not support upscaling according to the AI codec may classify the resolution of the first content 151 as a resolution of 4K, thus obtaining a final resolution of 4K for the first content 151. Thus, the display apparatus 110 may display a screen 595 including content-related information including a final resolution of 4K 596 for the first content 151. In FIG. 5B, a case is taken as an example in which a poster image (or a thumbnail image), a movie title (e.g., 'Movie A'), characters, a resolution, and a summary of content are included in content-related information.

FIG. 5C is a diagram showing operations performed to provide a content list, according to an embodiment. In FIG. 5C, except that a transmission request for a content list, instead of the transmission request for the content-related information of FIG. 5A, is transmitted from a display apparatus 502 to the server 501, operations shown in FIG.

5C may correspond to the operations shown in FIG. 5A. More specifically, operations S510, S520, S530, S540, and S550 of FIG. 5C may correspond to operations S501, S502, S503, S504, and S505 of FIG. 5A. Thus, when the operations shown in FIG. 5C are described, a description overlapping with that made with reference to FIG. 5A may be omitted below.

Referring to FIG. 5C, the display apparatus 502 may receive a user input for requesting providing of a content list in operation S500.

The display apparatus 502 may transmit resolution information thereof and a transmission request for a content list to the server in operation S510. Operation S510 may be performed by a communicator (320 of FIG. 3) under control of a processor (310 of FIG. 3) of the display apparatus 502.

Herein, the resolution information may indicate information about a resolution of an image output by the display apparatus 502. More specifically, the resolution information may include a maximum resolution of an image output by the display apparatus 502. The resolution information may include information indicating whether the display apparatus 502 supports upscaling of a resolution. For example, the resolution information may include a flag indicating whether the display apparatus 502 supports AI upscaling.

The transmission request for the content list may include information about contents that may be provided to the display apparatus 502 from the server 501. The transmission request for the content list may be a transmission request for a list of all contents retained by (or providable in connection with) the server 501, a transmission request for a list of particular content, or a transmission request for a list of contents having a particular resolution.

For example, the user may desire to select and watch any one of the contents retained by (or providable in connection with) the server 501. Then, the user may input a user input for requesting display of the list of the contents retained by (or providable in connection with) the server 501 to the display apparatus 502. The display apparatus 502 may transmit a transmission request for the list of the contents retained by (or providable in connection with) the server 501 to the server 501, in response to the user input. The server 501 may transmit a list of contents that may be reproduced in the display apparatus 502 among providable contents thereof to the display apparatus 502. For example, when the display apparatus 502 supports a resolution of 4K as a maximum resolution, the server 501 may filter contents having a resolution of 4K or less among the providable contents, and transmit a list of the filtered contents to the display apparatus 502. Then, the display apparatus 502 may generate a final content list based on the content list received from the server 501, and display the generated final content list. Thus, the user may view the final content list and select desired content from among at least one content included in the final content list. Then, the display apparatus 502 may transmit a request for transmission of image data corresponding to the user-selected content to the server 501. The server 501 may transmit the requested image data to the display apparatus 502. Thus, the display apparatus 502 may display a screen corresponding to the user-selected content based on the received image data.

In another example, when the user desires to watch any one of contents corresponding to a particular resolution, the user may input a user input for requesting displaying of a list of the contents corresponding to the particular resolution to the display apparatus 502. The display apparatus 502 may transmit a transmission request for the list of the contents corresponding to the particular resolution to the server 501, in response to the user input. The server 501 may transmit the list of the contents corresponding to the particular resolution among the providable contents to the display apparatus 502. Then, the display apparatus 502 may generate a final content list corresponding to the particular resolution, based on the content list received from the server 501, and display the generated final content list. Thus, the user may view the final content list and select desired content from among at least one content included in the final content list. Then, the display apparatus 502 may transmit a request for transmission of image data corresponding to the user-selected content to the server 501. The server 501 may transmit the requested image data to the display apparatus 502. Thus, the display apparatus 502 may display a screen corresponding to the user-selected content based on the received image data.

In another example, when the user desires to watch particular content, the user may input a user input for requesting displaying of a content list for the particular content to the display apparatus 502. Then, the display apparatus 502 may transmit a transmission request for the content list to the server 501 in response to the user input. The server 501 may transmit the content list for the particular content among the providable contents to the display apparatus 502. Herein, the content list for the particular content may be a list of the particular contents having different resolutions. For example, the particular content may be the movie 'Frozen'. The server 501 may provide contents with a plurality of different resolutions for the movie 'Frozen'. For example, the server 501 may provide 'Frozen' with a resolution of 2K, 'Frozen' with a resolution of 4K, and 'Frozen' with a resolution of 8K. The maximum resolution of the display apparatus 502 may be 4K, for example. In this case, the server 501 may transmit a list including 'Frozen' with a resolution of 2K and 'Frozen' with a resolution of 4K to the display apparatus 502 (and not including 'Frozen' with a resolution higher than 4K).

The server 501 may obtain the content list corresponding to the transmission request transmitted in operation S510, based on resolution information of the display apparatus 502, in operation S520. Operation S520 may be performed under control of the processor (410 of FIG. 4B) of the server 501. Herein, the content list, which is a list of providable contents, may include information (specifically, content-related information) corresponding to each of the providable contents.

More specifically, when among a plurality of contents retained by (or providable in connection with) the server 501, the first content is content that is downscaled using the first scheme, the content list may include information indicating that the first content is the downscaled content.

For example, it may be assumed that the content list includes the first content 151 and the second content 152 as described above with reference to FIG. 1. In this case, the content list may include information about the first content 151 and information about the second content 152. Herein, information related to each content (e.g., the first content 151) included in the content list may include information about a title of the first content 151 (e.g., a title of a movie, etc.), an image indicating the first content 151 (e.g., a thumbnail image, a poster image of the movie, etc.), a running time of the first content 151, information indicating whether the first content 151 is downscaled content (e.g., a flag indicating downscaling, etc.), and/or a resolution of the first content 151 (e.g., when the first content 151 is downscaled according to an AI codec, a resolution after downscaling), etc.

The server 501 may transmit the content list corresponding to the transmission request for the content list to the display apparatus 502 in operation S530. Operation S530 may be performed by a communicator (420 of FIG. 4B) under control of a processor (410 of FIG. 4B) of the server 501. Thus, the display apparatus 502 may receive the content list corresponding to the transmission request for the content list transmitted in operation S510 from the server 501.

For example, when the transmission request transmitted in operation S510 is a transmission request for a list of contents retained by (or providable in connection with) the server 501, the server 501 may transmit a list corresponding to the transmission request transmitted in operation S510, i.e., a list of contents having resolutions lower than or equal to the maximum resolution of the display apparatus 502 among the contents retained by the server 501 to the display apparatus 502, in operation S530. In another example, when the transmission request transmitted in operation S510 is a transmission request for a list of contents having a specific resolution (e.g., 4K), the server 501 may transmit a list corresponding to the transmission request transmitted in operation S510, i.e., a list of contents having a resolution of 4K among the contents retained by the server 501 to the display apparatus 502, in operation S530.

In operation S540, the display apparatus 502 may generate a final content list by classifying at least one content included in the content list received in operation S530 according to a resolution, based on whether the display apparatus 502 supports upscaling. Operation S540 may be performed by a processor (310 of FIG. 3) of the display apparatus 502. In addition, the final content list may include a final resolution corresponding to each content.

More specifically, it may be assumed that the plurality of contents included in the content list received in operation S530 include the first content that has the first resolution and is downscaled using the first scheme. Then, in operation S540, when the display apparatus 502 supports upscaling using the second scheme corresponding to the first scheme, the first content may be classified as a content group corresponding to the second resolution higher than the first resolution (or the first content may be classified in both the content group corresponding to the second resolution and a content group corresponding to the first resolution). Conversely, when the display apparatus 502 does not support upscaling using the second scheme corresponding to the first scheme, the first content may be classified as a content group corresponding to the first resolution. Herein, the first resolution may mean a downscaled resolution. For example, when the first content is the first content 151 shown in FIG. 1, the first resolution may be 4K and the second resolution may be the original resolution of 8K before being downscaled.

The display device 502 may classify content, which has the first resolution and is not downscaled, among the plurality of contents included in the content list received in operation S530, as a content group corresponding to the first resolution. For example, for content which has the original resolution and exists in the server 501 without being downscaled, the resolution of the content may be classified as a resolution of 4K.

Operation S540 is described in more detail below with reference to FIG. 7B.

The display device 502 may display the final resolution list generated in operation S540 in operation S550. Operation S550 may be performed by a display (330 of FIG. 3) under control of a processor (310 of FIG. 3) of the display apparatus 502.

Figure 6A:
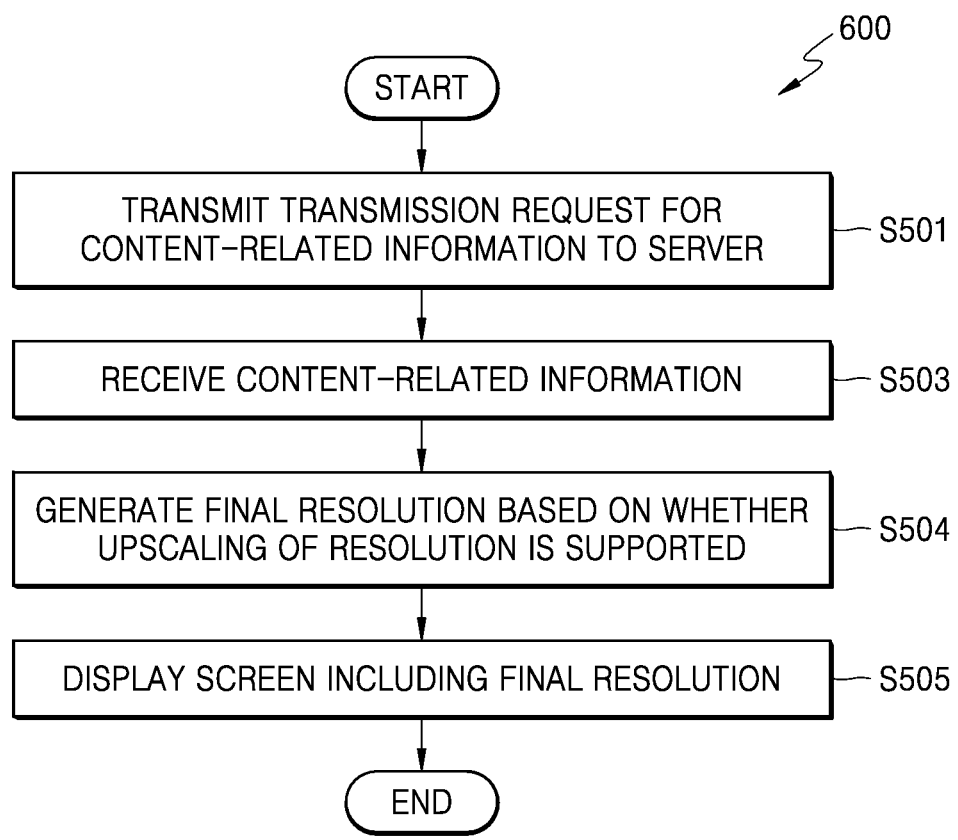
FIG. 6A is a flowchart illustrating an operating method of a display apparatus according to an embodiment.

FIG. 6A is a flowchart illustrating an operating method 600 of a display apparatus according to an embodiment. FIG. 6A is a flowchart illustrating operations performed by the display apparatus 100, 300, 400, or 502 according to an embodiment to provide content-related information including a resolution. In FIG. 6A, the same components as in FIG. 5A are illustrated using the same reference numerals, and thus a description overlapping with the foregoing descriptions may be omitted below.

Hereinbelow, a description is provided using as an example, a case where an operating method 600 shown in FIG. 6A is performed by the display apparatus 400 shown in FIG. 4A communicating with the server 450 shown in FIG. 4B.

Referring to FIG. 6A, the display apparatus 400 may transmit resolution information thereof and a transmission request for content-related information to the server 450 in operation S501. Operation S501 may be performed by the communicator 320 under control of the processor 310 of the display apparatus 400.

In the operating method 600, operation S500 described in FIG. 5A may be performed prior to operation S501.

The display apparatus 502 may receive content-related information corresponding to a transmission request (specifically, a transmission request for content-related information) transmitted in operation S501, from the server (e.g., 450 of FIG. 4B), in operation S503. Operation S503 may be performed by the communicator 320 under control of the processor 310 of the display apparatus 400.

In operation S504, the display apparatus 502 may obtain a final resolution by classifying a resolution of content included in the content-related information received in operation S503, based on whether the display apparatus 502 supports upscaling. Operation S504 may be performed by the processor 310 of the display apparatus 400.

In operation S505, the display apparatus 502 may display a screen including the content-related information including the final resolution obtained in operation S504. Operation S505 may be performed by the display 330 under control of the processor 310 of the display apparatus 400.

Figure 6B:
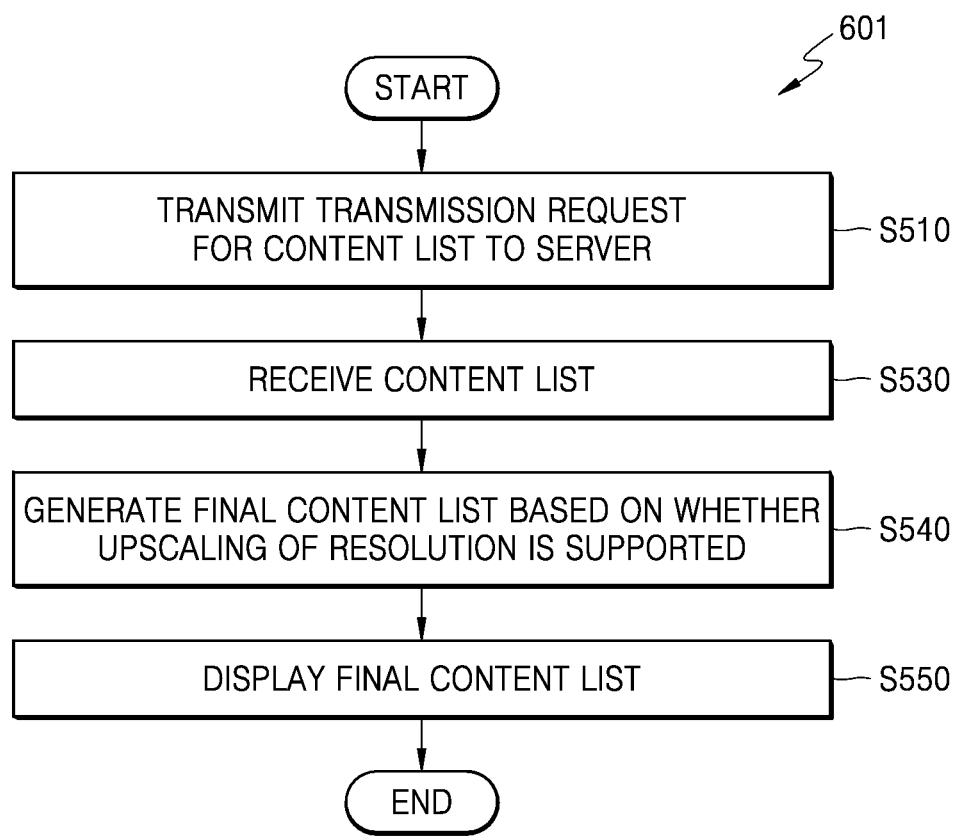
FIG. 6B is another flowchart illustrating an operating method of a display apparatus according to an embodiment.

FIG. 6B is another flowchart illustrating an operating method 601 of a display apparatus according to an embodiment. FIG. 6B is also a flowchart illustrating operations performed by the display apparatus 100, 300, 400, or 502 according to an embodiment to provide a content list. In FIG. 6B, the same components as in FIG. 5C are illustrated using the same reference numerals, and thus a description overlapping with the foregoing descriptions may be omitted below.

Hereinbelow, a description will be made using as an example, a case where an operating method 601 shown in FIG. 6B is performed by the display apparatus 400 shown in FIG. 4A communicating with the server 450 shown in FIG. 4B.

Referring to FIG. 6B, the display apparatus 400 may transmit resolution information thereof and a transmission request for a content list to the server, in operation S510. Operation S510 may be performed by the communicator 320 under control of the processor 310 of the display apparatus 400.

In the operating method 601, operation S500 described in FIG. 5C may be performed prior to operation S510.

The display apparatus 502 may receive a content list corresponding to the transmission request for the content list transmitted in operation S510, from the server (e.g., 450 of FIG. 4B), in operation S530. Operation S530 may be performed by the communicator 320 under control of the processor 310 of the display apparatus 400.

In operation S540, the display apparatus 502 may generate a final content list by classifying at least one content included in the content list received in operation S530 according to a resolution, based on whether the display apparatus 502 supports upscaling. Operation S540 may be performed by the processor 310 of the display apparatus 400.

The display device 502 may display the final resolution list generated in operation S540 in operation S550. Operation S550 may be performed by the display 330 under control of the processor 310 of the display apparatus 400.

Figure 7A:
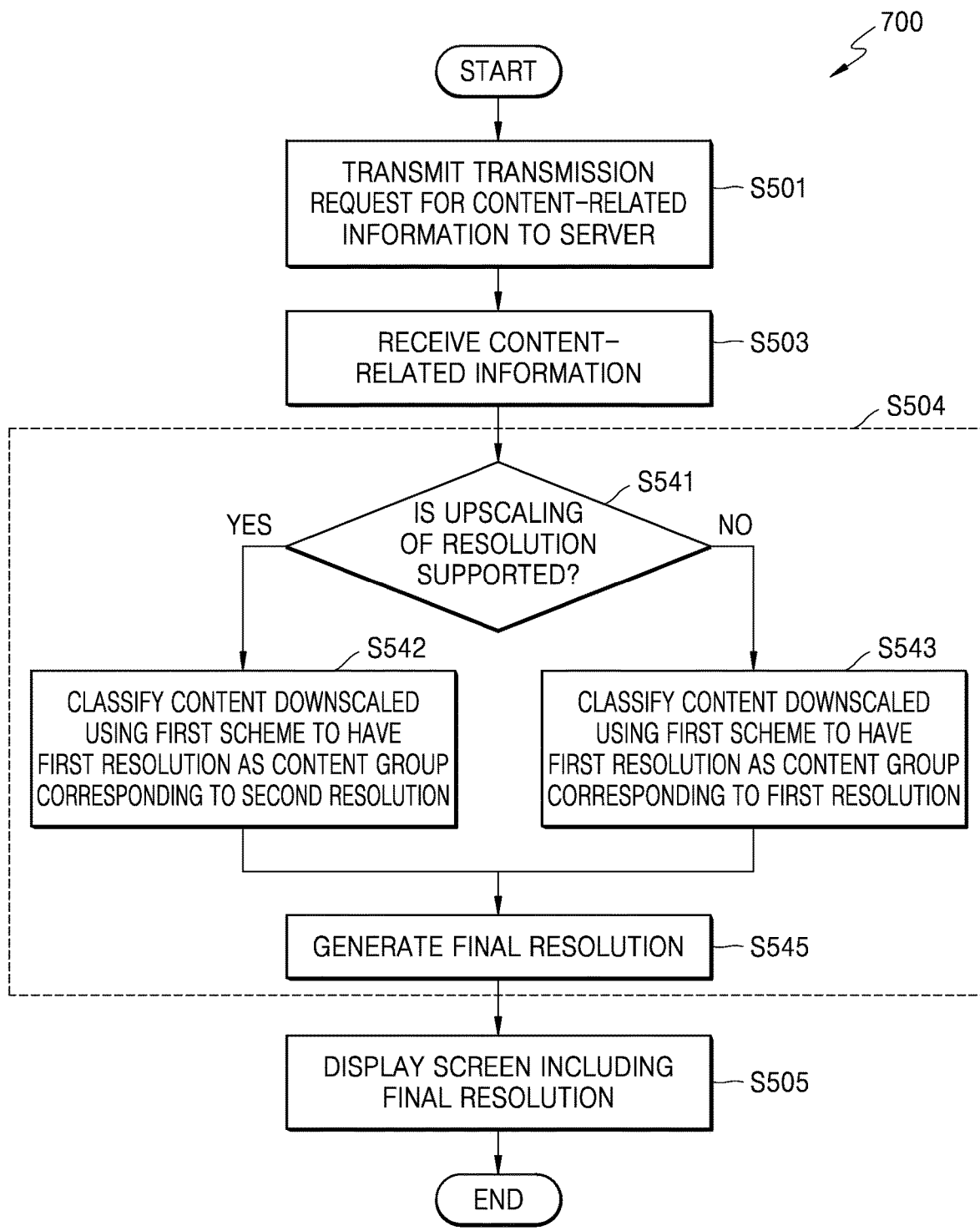
FIG. 7A is another flowchart illustrating an operating method of a display apparatus according to an embodiment.

FIG. 7A is another flowchart illustrating an operating method 700 of a display apparatus according to an embodiment. FIG. 7A is also a flowchart illustrating operations performed by the display apparatus 100, 300, 400, or 502 according to an embodiment to provide content-related information. In FIG. 7A, the same components as in FIGS. 5A and 6 are illustrated using the same reference numerals, and thus a description overlapping with the foregoing descriptions may be omitted below. In addition, a description will be made using as an example, a case where an operating method 700 shown in FIG. 7A is performed by the display apparatus 400 shown in FIG. 4A communicating with the server 450 shown in FIG. 4B.

Referring to FIG. 7A, operation S504 may include operations S541, S542, S543, and S544.

More specifically, after operation S503, the operating method 700 of the display apparatus includes determining whether the display apparatus 400 supports upscaling in operation S541. Operation S541 may be performed by the processor 310 of the display apparatus 400. More specifically, in operation S541, it may be determined whether the display apparatus 400 is a display apparatus capable of performing AI upscaling.

In an embodiment, based on whether the display apparatus 400 supports upscaling, it may be determined whether to classify a resolution of content downscaled using the first scheme, which is included in the content-related information received in operation S503, as a higher resolution. More specifically, based on whether the display apparatus 400 supports upscaling according to the second scheme corresponding to the first scheme, it may be determined whether to classify the resolution of the content downscaled using the first scheme as the content corresponding to the higher resolution.

Referring back to FIG. 7A, it may be assumed that the content-related information received in operation S503 is information about the first content that is downscaled using the first scheme to have the first resolution. When the display apparatus 400 supports upscaling using the second scheme corresponding to the first scheme as a result of the determination of operation S541, the resolution of the first content may be classified as the second resolution that is a higher resolution than the first resolution, in operation S542. Herein, 'the second scheme corresponding to the first scheme' may mean that the first scheme and the second scheme have been jointly trained according the AI codec.

For example, it may be assumed that the first content having a resolution of 8K is downscaled to 4K according to AI downscaling and is stored in the server 450. It is also assumed that the display apparatus 400 receiving the content list including an item for the first content supports AI upscaling. When the display apparatus 400 supports upscaling as a result of the determination of operation S541, the first content may be classified as a content group corresponding to the second resolution (e.g., 8K) that is the higher resolution than the first resolution (e.g., 4K) in operation S542. Herein, the second resolution that is the higher resolution may indicate the original resolution prior to downscaling of the first content.

Conversely, when the display apparatus 400 does not support upscaling using the second scheme corresponding to the first scheme as a result of the determination of operation S541, the resolution of the first content may be maintained and classified as the first resolution, in operation S543. More specifically, when the display apparatus 400 does not support upscaling using the second scheme corresponding to the first scheme, the display apparatus 400 may not be able to upscale the resolution of the content downscaled using the first scheme. Thus, when the display apparatus 400 receives the first content, the display apparatus 400 may be able to reproduce the first content at the first resolution that is downscaled resolution, but may not be able to reproduce the first content at the higher resolution than the first resolution. Therefore, in this case, by classifying the resolution of the first content as the downscaled resolution, accurate resolution information may be provided to a user, specifically, a user desiring to watch the first content.

The display apparatus 400 may obtain a resolution based on the classification of operations S541, S542, and S543, i.e., a final resolution, in operation S544.

Figure 7B:
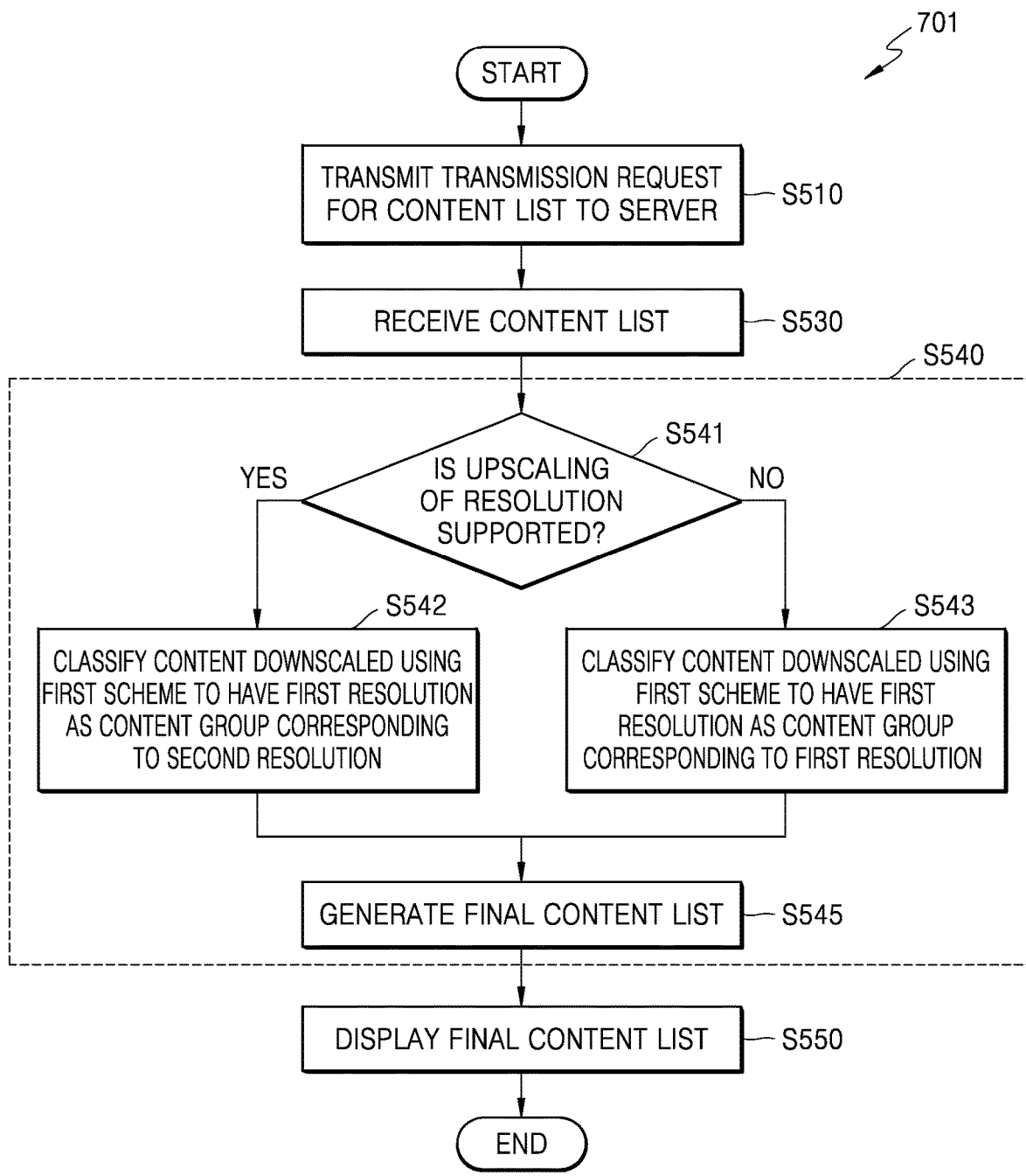
FIG. 7B is another flowchart illustrating an operating method of a display apparatus according to an embodiment.

FIG. 7B is another flowchart illustrating an operating method 701 of a display apparatus according to an embodiment. FIG. 7B is also a flowchart illustrating in detail operations performed by the display apparatus 100, 300, 400, or 502 according to an embodiment to provide a content list. In FIG. 7B, the same components as in FIGS. 5C and 6B are illustrated using the same reference numerals, and thus a description overlapping with the foregoing descriptions may be omitted below. In addition, a description will be made using as an example, a case where an operating method 701 shown in FIG. 7B is performed by the display apparatus 400 shown in FIG. 4A communicating with the server 450 shown in FIG. 4B.

Referring to FIG. 7B, operation S540 may include operations S541, S542, S543, and S544.

More specifically, after operation S530, the operating method 701 of the display apparatus includes determining whether the display apparatus 400 supports upscaling in operation S541. Operation S541 may be performed by the processor 310 of the display apparatus 400. More specifically, in operation S541, it may be determined whether the display apparatus 400 is a display apparatus capable of performing AI upscaling.

In an embodiment, based on a determination of whether the display apparatus 400 supports upscaling, it may be determined whether to classify, as content corresponding to a higher resolution, a resolution of content downscaled using the first scheme among the plurality of contents included in the content list received in operation S503. In particular, based on whether the display apparatus 400 supports upscaling according to the second scheme corresponding to the first scheme, it may be determined whether to classify the resolution of the content downscaled using the first scheme as the content corresponding to the higher resolution.

Referring back to FIG. 7B, it may be assumed that the content list received in operation S530 includes the plurality of contents including the first content which is downscaled using the first scheme and thus has the first resolution. When the display apparatus 400 supports upscaling using the second scheme corresponding to the first scheme as a result of the determination of operation S541, the first content may be classified as a content group corresponding to the second resolution that is a higher resolution than the first resolution, in operation S542. Herein, 'the second scheme corresponding to the first scheme' may mean that the first scheme and the second scheme have been jointly trained according to the AI codec.

For example, it may be assumed that the first content having a resolution of 8K is downscaled to 4K according to AI downscaling and is stored in the server 450. It is also assumed that the display apparatus 400 receiving the content list including an item for the first content supports AI upscaling. When the display apparatus 400 supports upscaling as a result of the determination of operation S541, the first content may be classified as a content group corresponding to the second resolution (e.g., 8K) that is the higher resolution than the first resolution (e.g., 4K), in operation S542. Herein, the second resolution that is the higher resolution than the first resolution may indicate the original resolution prior to downscaling of the first content.

Conversely, when the display apparatus 400 does not support upscaling using the second scheme corresponding to the first scheme as a result of the determination of operation S541, the first content may be classified as a content group corresponding to the first resolution, in operation S543. More specifically, when the display apparatus 400 does not support upscaling using the second scheme corresponding to the first scheme, the display apparatus 400 may not be able to upscale the resolution of the content downscaled using the first scheme. Thus, when the display apparatus 400 receives the first content, the display apparatus 400 may be able to reproduce the first content at the first resolution that is downscaled resolution, but may not be able to reproduce the first content at the higher resolution than the first resolution. Therefore, in this case, by classifying the resolution of the first content as the downscaled resolution, accurate resolution information may be provided to a user, specifically, a user desiring to watch the first content.

In operation S545, the display apparatus 400 may generate the final content list to include the final resolution obtained according to the classification of operations S541, S542, and S543. Herein, the final content list may include at least one item respectively corresponding to at least one content. For example, each item may include information about at least one of a title of content (e.g., a title of a movie), a running time of the content, an image indicating the content (e.g., a thumbnail image, a poster image of the movie, etc.), information indicating whether the content is downscaled content (e.g., a flag indicating downscaling, etc.), and/or a final resolution obtained according to the classification of operations S542 and S543.

Figure 8:
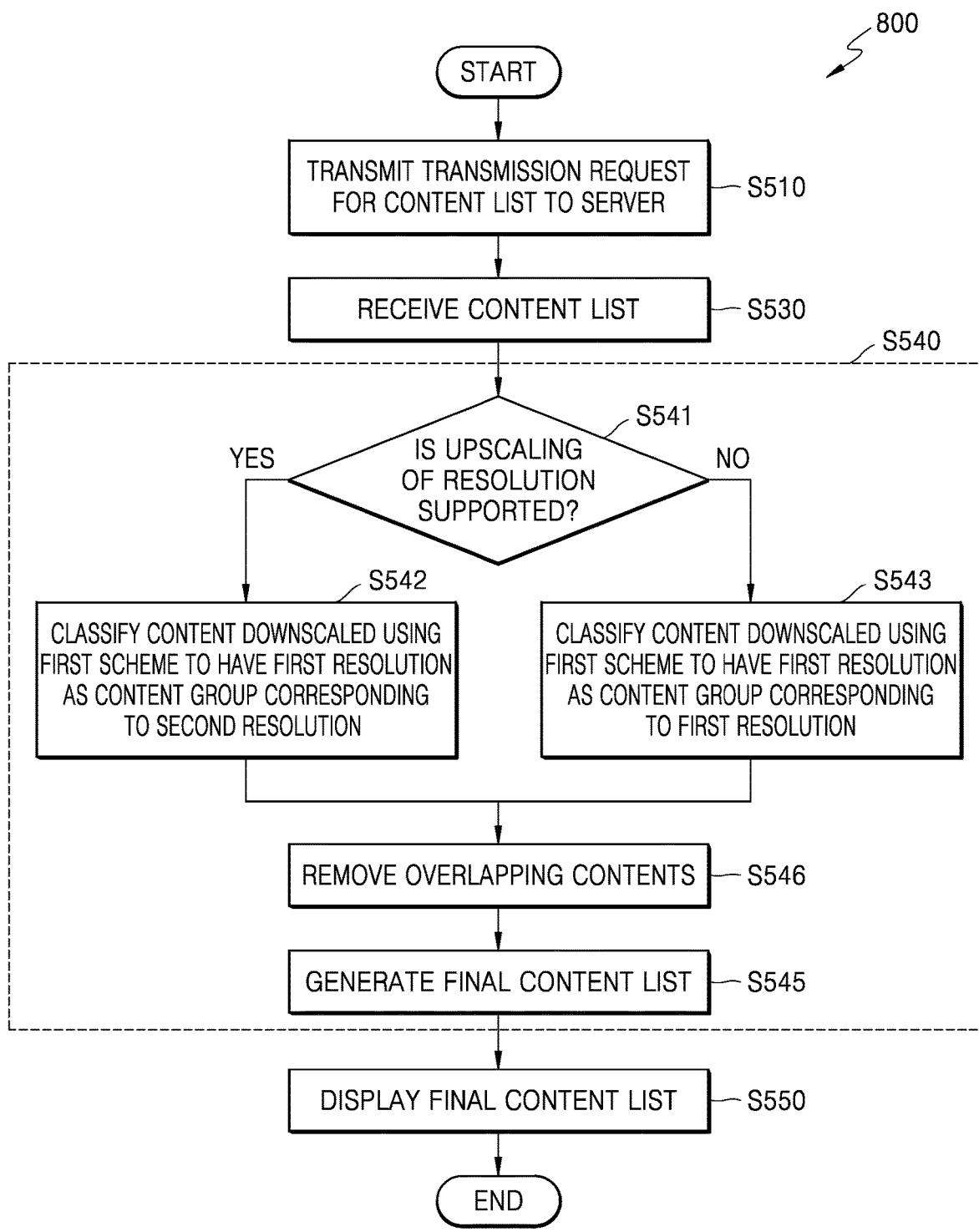
FIG. 8 is another flowchart illustrating an operating method of a display apparatus according to an embodiment.

FIG. 8 is another flowchart illustrating an operating method 800 of a display apparatus according to an embodiment. FIG. 8 is also a flowchart illustrating in detail operations performed by the display apparatus 100, 300, 400, or 502 according to an embodiment to provide a content list. In FIG. 8, the same components as in FIGS. 5C, 6B, and 7B are illustrated using the same reference numerals, and thus a description overlapping with the foregoing descriptions may be omitted below. In addition, a description will be made using, as an example, a case where an operating method 800 shown in FIG. 8 is performed by the display apparatus 400 shown in FIG. 4A communicating with the server 450 shown in FIG. 4B.

As compared to the operating method 701 shown in FIG. 7B, the operating method 800 may further include operation S546 of removing overlapping contents from contents included in the content list after completion of resolution classification through operations S542 and S543. Herein, operation S546 may be performed by the processor 310.

Herein, the overlapping contents may mean contents having the same resolution and details. For example, when two contents having the same resolution for the same movie exist, it may be determined that the overlapping contents exist. By removing all but one from among a pair or plurality of overlapping contents, a final content list may be generated.

More specifically, when upscaling of a resolution is possible in the display apparatus 400 because the display apparatus 400 supports upscaling, upscalable content (specifically, content transmitted in a state of being downscaled by the server 450) and non-upscalable content (specifically, the original content that is not downscaled by the server 450) may overlap with each other. In this case, the processor 310 may include the upscalable content in the final content list and remove the non-upscalable content from the final content list. For example, it may be assumed that the server 450 provides (i) Movie A having a resolution of 8K and (ii) Movie A having a resolution of 4K downscaled from the original resolution of 8K thereof. In this case, when the display apparatus 400 supports upscaling, Movie A downscaled to have a resolution of 4K may be reconstructed to Movie A having a resolution of 8K in the display apparatus 400. Thus, the display apparatus 400 may recognize (i) Movie A having a resolution of 8K and (ii) Movie A downscaled to a resolution of 4K from the original resolution of 8K thereof, as overlapping contents. As compared to transmission of (i) Movie A having a resolution of 8K, transmission of (ii) Movie A downscaled to a resolution of 4K from the original resolution thereof to the display apparatus 400 from the server 450 may be useful in terms of a transmission rate and a transmission resource, such that the final content list may include Movie A downscaled to a resolution of 4K from the original resolution of 8K thereof.

Hereinbelow, an operation of generating a final content list by classifying resolutions of contents is described in detail with reference to a detailed example.

For example, it may be assumed that the server 450 provides 1) first content: Movie A downscaled to have a resolution of 2K (in this case, the original resolution before downscaling is 4K), 2) second content: Movie A downscaled to have a resolution of 4K (in this case, the original resolution before downscaling is 8K), 3) third content: Movie A having a resolution of 8K that is not downscaled, 4) fourth content: Movie B downscaled to have a resolution of 2K (in this case, the original resolution before downscaling is 4K), 5) fifth content: Movie B downscaled to have a resolution of 4K (in this case, the original resolution before downscaling is 8K), 6) sixth content: Movie B having a resolution of 8K that is not downscaled, 7) seventh content: Movie C downscaled to have a resolution of 2K (in this case, the original resolution before downscaling is 4K), 8) eighth content: Movie C downscaled to have a resolution of 4K (in this case, the original resolution before downscaling is 8K), and 9) ninth content: Movie C having a resolution of 8K that is not downscaled. That is, the server 450 may provide a total of nine contents including the first through ninth contents.

In an embodiment, it may be assumed that the server 450 does not overlappingly store the same contents having the same resolution. For example, when both Movie A downscaled to have a resolution of 4K and Movie A having the original resolution of 4K exist, the server 450 may merely store Movie A downscaled to have a resolution of 4K. This is because both Movie A downscaled to have a resolution of 4K and Movie A having the original resolution of 4K have the same resolution of 4K, and thus are stored in the same memory volume and need the same transmission resource, but content corresponding to the Movie A downscaled to have a resolution of 4K is upscalable and thus may be reproduced at a higher resolution. Therefore, owning the downscaled content alone may be more useful in terms of resolution.

A case will be taken as an example in which the transmission request of step 510 is a transmission request for a list of all contents retained by (or providable in connection with) the server 450.

In the foregoing example, the display apparatus 400 may be assumed to be a display apparatus supporting upscaling and having a maximum resolution of 8K. In operation S530, a content list of first through ninth contents, which is a list corresponding to the transmission request of operation S510, may be received in the display apparatus 400. The display apparatus 400 supports upscaling, such that the processor 310 of the display apparatus 400 may classify the resolution of the first content (Movie A) as a resolution of 4K rather than 2K, the resolution of the second content (Movie A) as a resolution of 8K rather than 4K, the resolution of the third content (Movie A) as a resolution of 8K, the resolution of the fourth content (Movie B) as a resolution of 4K rather than 2K, the resolution of the fifth content (Movie B) as a resolution of 8K rather than 4K, and the resolution of the sixth content (Movie B) as a resolution of 8K. The processor 310 may classify the resolution of the seventh content (Movie C) as a resolution of 4K rather than 2K, the resolution of the eighth content (Movie C) as a resolution of 8K rather than 4K, and the resolution of the ninth content (Movie C) as a resolution of 8K.

Thus, according to the foregoing resolution classification, the content list may include Movie A having a resolution of 4K (the first content), Movie A having a resolution of 8K (the second content), Movie A having a resolution of 8K (the third content), Movie B having a resolution of 4K (the fourth content), Movie B having a resolution of 8K (the fifth content), Movie B having a resolution of 8K (the sixth content), Movie C having a resolution of 4K (the seventh content), Movie C having a resolution of 8K (the eighth content), and Movie C having a resolution of 8K (the ninth content).

Herein, Movie A having a resolution of 8K (the second content) and Movie A having a resolution of 8K (the third content) overlap with each other, Movie B having a resolution of 8K (the fifth content) and Movie B having a resolution of 8K (the sixth content) overlap with each other, and Movie C having a resolution of 8K (the eighth content) and Movie C having a resolution of 8K (the ninth content) overlap with each other.

Thus, by removing the overlapping contents in operation S546, between Movie A having a resolution of 8K (the second content) and Movie A having a resolution of 8K (the third content), Movie A having a resolution of 8K (the third content), which is non-downscaled content, may be removed. Between Movie B having a resolution of 8K (the fifth content) and Movie B having a resolution of 8K (the sixth content), Movie B having a resolution of 8K (the sixth content), which is non-downscaled content, may be removed. Between Movie C having a resolution of 8K (the eighth content) and Movie C having a resolution of 8K (the ninth content), Movie C having a resolution of 8K (the ninth content), which is non-downscaled content, may be removed.

Thus, the final content list generated in operation S544 may include a total of six contents including Movie A having a resolution of 4K (the first content), Movie A having a resolution of 8K (the second content), Movie B having a resolution of 4K (the fourth content), Movie B having a resolution of 8K (the fifth content), Movie C having a resolution of 4K (the seventh content), and Movie C having a resolution of 8K (the eighth content).

By way of another example with reference to the aforementioned content, the display apparatus 400 may be assumed to be a display apparatus not supporting upscaling and having a maximum resolution of 8K. Then, in operation S530, a content list of first through ninth contents, which is a list corresponding to the transmission request of operation S510, may be received in the display apparatus 400. The display apparatus 400 does not support upscaling, such that the processor 310 of the display apparatus 400 may classify the resolution of the first content as a resolution of 2K, the resolution of the second content as a resolution of 4K, the resolution of the third content as a resolution of 8K, the resolution of the fourth content as a resolution of 2K, the resolution of the fifth content as a resolution of 4K, and the resolution of the sixth content as a resolution of 8K. The processor 310 may classify the resolution of the seventh content as a resolution of 2K, the resolution of the eighth content as a resolution of 4K, and the resolution of the ninth content as a resolution of 8K. In this case, overlapping contents do not exist, such that a final content list including a total of nine contents may be generated according to the classified resolutions.

It may be also assumed that the transmission request of operation S510 is a transmission request for a list including contents corresponding to a particular resolution (e.g., 'the first resolution') among all the contents that may be provided. In this case, when the display apparatus 400 supports upscaling, the final content list may include at least one of at least one content having the first resolution, at least one content downscaled to have the third resolution lower than the first resolution, or at least one content downscaled to have the first resolution, among all the contents retained by the server 450.

A case will be taken as an example in which when the server 450 provides the first through ninth contents, the transmission request of operation S510 is the transmission request for the list of contents having a resolution of 8K, as in the foregoing example. In this case, the server 450 may obtain, in response to the transmission request, a list (hereinafter, a first list) including 3) third content: Movie A having a resolution of 8K that is not downscaled, 6) sixth content: Movie B having a resolution of 8K that is not downscaled, and 9) ninth content: Movie C having a resolution of 8K that is not downscaled.

When the display apparatus 400 transmitting the transmission request of operation S510 supports upscaling, the server 450 may further obtain a list (hereinafter, a second list) of contents that may be generated at a resolution of 8K through upscaling, i.e., 2) the second content: Movie A downscaled to have a resolution of 4K (in this case, the original resolution before downscaling is 8K), 5) fifth content: Movie B downscaled to have a resolution of 4K (in this case, the original resolution before downscaling is 8K), and 8) eighth content: Movie C downscaled to have a resolution of 4K (in this case, the original resolution before downscaling is 8K).

When the display apparatus 400 transmitting the transmission request of operation S510 supports upscaling, the server 450 may transmit a content list, generated by merging the first list with the second list and removing overlapping contents, to the display apparatus 400.

More specifically, the server 450 may remove the overlapping contents based on the original resolutions of the downscaled contents. For example, both '2) the second content: Movie A downscaled to have a resolution of 4K (in this case, the original resolution before downscaling is 8K)' and '3) third content: Movie A having a resolution of 8K that is not downscaled' may be reproduced at a resolution of 8K in the display apparatus 400, and it may be determined that these two contents overlap with each other. Moreover, transmission of downscaled content is favorable to transmission efficiency, and thus the server 450 may select downscaled content between overlapping contents. That is, the content list may be generated to include the second content between the second content and the third content. Thus, the server 450 may transmit the content list including the second content, the fifth content, and the eighth content, which is generated by merging the first list with the second list and removing overlapping contents, to the display apparatus 400.

In another example, the server 450 may transmit the content list, generated by merging the first list with the second list, to the display apparatus 400. Then, the display apparatus 400 may generate a final content list including the second content, the fifth content, and the eighth content by removing overlapping contents.

In an embodiment, when the final content list is displayed, the user of the display apparatus 400 may select content included in the final content list. Then, the processor 310 of the display apparatus 400 may receive image data corresponding to the selected content from the server 450 and reproduce the received image data. When the display apparatus 400 supports upscaling and the selected content is downscaled content, the display apparatus 400 may receive image data corresponding to the downscaled content, and upscale and reproduce the received image data.

Related art systems do not classify and process a resolution of content according to an AI codec. Meanwhile, according to an embodiment, a resolution of content may be classified based on whether a display apparatus supports upscaling, more specifically, upscaling according to the AI codec, and a content list may be generated according to the classified resolution and provided to the user. Hence, an embodiment may accurately classify a resolution of downscaled content and provide the same to the user. By accurately classifying the resolution of the downscaled content and providing the same to the user, image data corresponding to the content that has to be transmitted from the server may be minimized.

Upscaling of the display apparatus 400 is described in detail below with reference to FIGS. 9 and 10.

Figure 9:
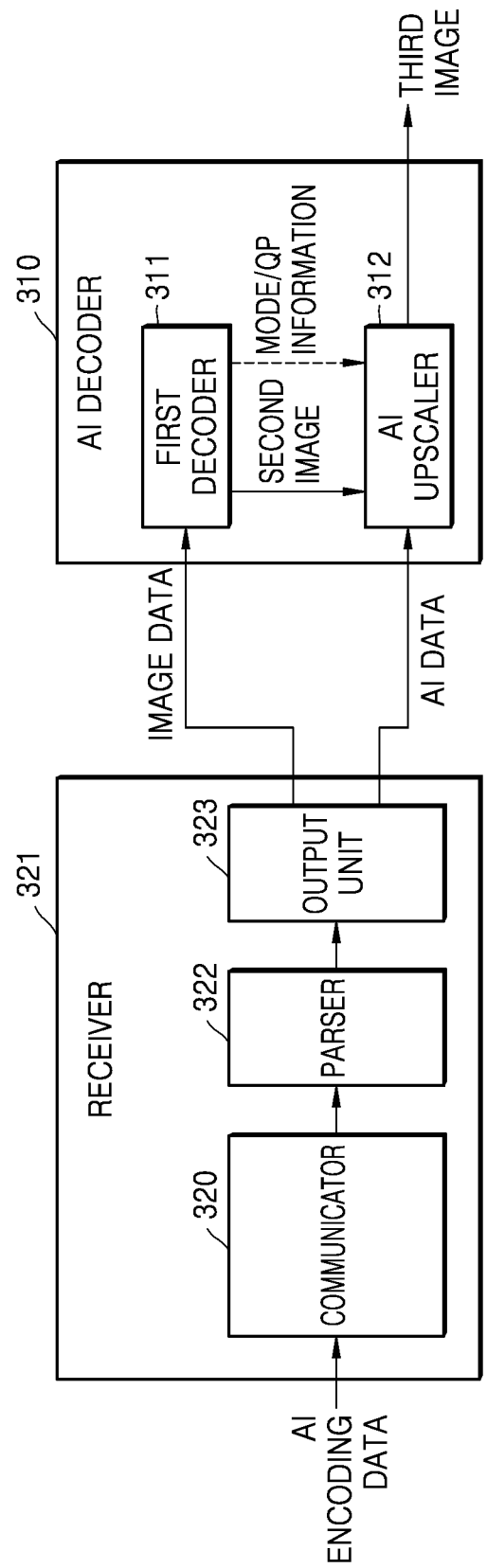
FIG. 9 is a detailed block diagram of a display apparatus according to an embodiment.

FIG. 9 is a block diagram of a display apparatus according to an embodiment.

FIG. 9 is a block diagram illustrating in more detail the receiver 321 and the processor 310 when the display apparatus 300 or 400 shown in FIG. 3 or FIG. 4 supports upscaling.

Referring to FIG. 9, the receiver 321 may include a communicator 320, a parser 322, and an output unit 323 (e.g., outputter). The processor 310 may include components required or used for AI decoding, more specifically, a first decoder 311 and an AI upscaler 312. The decoder 311 and the AI upscaler 312 shown in FIG. 9 may equally correspond to the first decoder 252 and the AI upscaler 253 shown in FIG. 2, respectively, and thus a description overlapping with that made with reference to FIG. 2 may be omitted below.

FIG. 9 shows components for performing upscaling in the processor 310, which are thus indicated by an 'AI decoder' in the processor 310. That is, the AI decoder (e.g., which may be included in the processor 310) may be a module for performing AI upscaling.

The receiver 321 may receive and parse AI encoding data obtained as a result of AI encoding, and separately output the image data and the AI data to the processor 310.

More specifically, the communicator 320 may receive the AI encoding data obtained as a result of AI encoding over a network. The AI encoding data obtained as the result of AI encoding (more specifically, equally corresponding to the AI encoding data 223 of FIG. 2) may include image data and AI data. The image data and the AI data may be received through a homogeneous network or a heterogeneous network.

The parser 322 may receive the AI encoding data received through the communicator 320 and parse the AI encoding data to identify it as the image data or the AI data. For example, the parser 214 may read a header of data obtained from the communicator 320 to identify whether the data is the image data or the AI data. In an example, the parser 322 may identify the data received through the communicator 320 as the image data or the AI data based on the header of the received data and transmit the received data to the output unit 323 which may transmit the identified data to the first decoder 311 and the AI upscaler 312. In this case, the image data included in the AI encoding data may be identified as image data obtained through a certain codec (e.g., MPEG-2, H.264, MPEG-4, HEVC, VC-1, VP8, VP9, or AV1). To process the image data based on the identified codec, corresponding information may be transmitted to the first decoder 311 through the output unit 323.

In an embodiment, the AI encoding data to be parsed by the parser 322 may be obtained from a server (e.g., the server 450) or an external device (e.g., a data storage medium including magnetic media such as hard disk, floppy disk, and magnetic tape, optical media such as compact disk read only memory (CD-ROM) and digital versatile disk (DVD), magneto-optical media such as floptical disk, etc.).

The first decoder 311 may reconstruct a second image (e.g., 261 of FIG. 2) corresponding to a first image (e.g., 222 of FIG. 2) based on the image data. The second image (e.g., 261 of FIG. 2) obtained by the first decoder 311 may be provided to the AI upscaler 312. Depending on an implementation example, first decoding-related information such as prediction mode information, motion information, quantization parameter information, etc., included in the image data may be further provided to the AI upscaler 312.

The AI upscaler 312 having received the AI data may perform AI upscaling on the second image (e.g., 261 of FIG. 2) based on the AI data. Depending on an implementation example, the AI upscaler 312 may perform AI upscaling by further using first decoding-related information such as prediction mode information, quantization parameter information, etc., included in the image data.

The receiver 321 and the processor 310 according to an embodiment are described above as separate devices, but may also be implemented through one processor. In this case, the receiver 321 and the processor 310 may be implemented as dedicated processors, and may be implemented through a combination of a general-purpose processor, such as an application processor (AP), a central processing unit (CPU), or a graphic processing unit (GPU), and software (S/W). In addition, the dedicated processor may be implemented by including a memory for implementing an embodiment or by including a memory processor for using an external memory.

In addition, the receiver 321 and the processor 310 may include a plurality of processors. In this case, the receiver 321 and the processor 310 may be implemented as a combination of dedicated processors, and may be implemented as a combination of multiple general-purpose processors, such as an AP, a CPU, or a GPU, and S/W. Likewise, the AI upscaler 312 and the first decoder 311 may be implemented as different processors.

The AI data provided to the AI upscaler 312 may include information for AI-upscaling the second image (e.g., 261 of FIG. 2). An upscaling target corresponds to downscaling of the first DNN. Thus, the AI data includes information for identifying a downscaling target of the first DNN.

To be more specific about the information included in the AI data, the information may include at least one of difference information between a resolution of the original image (e.g., 221 of FIG. 2) and a resolution of the first image (e.g., 222 of FIG. 2), information related to the first image (e.g., 222 of FIG. 2), etc.

The difference information may be expressed in the form of information (e.g., resolution change rate information) about a resolution change level of the first image (e.g., 222 of FIG. 2) with respect to the original image (e.g., 221 of FIG. 2). Further, the resolution of the first image (e.g., 222 of FIG. 2) may be identified from the resolution of the reconstructed second image (e.g., 261 of FIG. 2), through which the resolution change level may be identified, such that the difference information may be expressed merely with resolution information of the original image (e.g., 221 of FIG. 2). Herein, the resolution information may be expressed as a screen size of width/length, and as a ratio (16:9, 4:3, etc.) and a size of one axis. When preset resolution information exists, the resolution information may also be expressed in the form of an index or a flag.

The information related to the first image (e.g., 222 of FIG. 2) may include information about at least one of a bitrate of image data obtained as a result of first encoding of the first image (e.g., 222 of FIG. 2) or a codec type used in first encoding of the first image (e.g., 222 of FIG. 2).

The AI upscaler 312 may determine an upscaling target of the second image (e.g., 261 of FIG. 2) based on at least one of the difference information included in the AI data or the information related to the first image (e.g., 222 of FIG. 2). The upscaling target may indicate, e.g., a level of a resolution to which the second image (e.g., 261 of FIG. 2) is to be upscaled. When the AI upscaler 312 determines the upscaling target, the AI upscaler 312 may perform AI upscaling on the second image (e.g., 261 of FIG. 2) through the second DNN to obtain the third image (e.g., 262 of FIG. 2) corresponding to the upscaling target.

Figure 10:
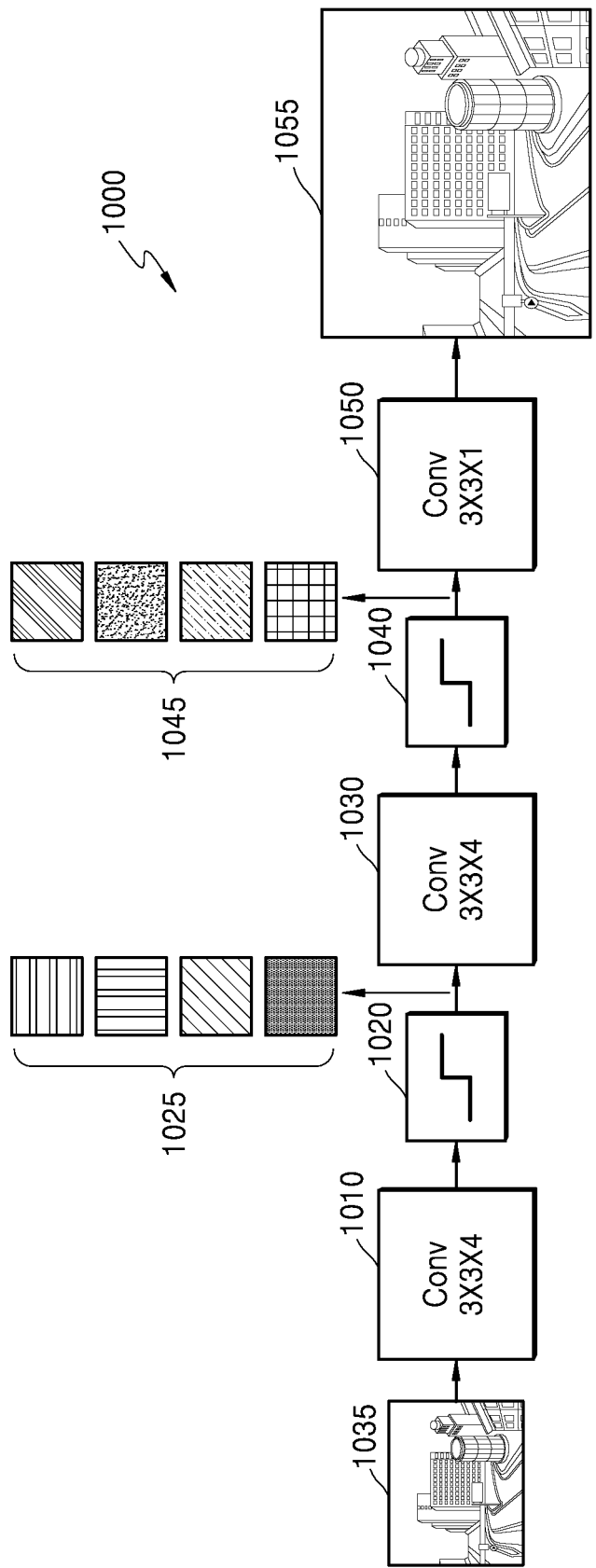
FIG. 10 is a diagram for describing a neural network for performing upscaling.

FIG. 10 is a diagram for describing a neural network for performing upscaling. More specifically, FIG. 10 illustrates a second DNN 1000 for AI-upscaling a second image 1035 (e.g., 261 of FIG. 2).

As shown in FIG. 10, the second image 1035 may be input to a first convolution layer 1010. 3×3×4 indicated in the first convolution layer 1010 shown in FIG. 10 illustrates convolution processing with respect to one input image by using four 3×3 filter kernels. As a result of convolution processing, four feature maps may be generated by the four filter kernels. Each feature map may indicate unique features of the second image 1035. For example, each feature map may indicate a vertical direction feature, a horizontal direction feature, an edge feature, etc., of the second image 1035.

Feature maps output from the first convolution layer 1010 may be input to a first activation layer 1020. More specifically, the first activation layer 1020 may apply a non-linear feature to each feature map. The first activation layer 1020 may include, but not limited to, a sigmoid function, a Tan h function, a rectified linear unit (ReLU) function, etc.

The first activation layer 1020 may determine whether to transmit sample values of feature maps output from the first convolution layer 1010 to a second convolution layer 1030. For example, among the sample values of the feature maps, some sample values may be activated by the first activation layer 1020 and transmitted to the second convolution layer 1030, and some other sample values may be deactivated by the first activation layer 1020 and thus not transmitted to the second convolution layer 1030. Unique features of the second image 1035 indicated by the feature maps may be enhanced by the first activation layer 1020.

Feature maps 1025 output from the first convolution layer 1020 may be input to the second convolution layer 1030. Any one of the feature maps 1025 shown in FIG. 10 may be a result of processing the feature map 1025 in the first activation layer 1020.

3×3×4 indicated in the second convolution layer 1030 illustrates convolution processing with respect to the input feature maps 1025 by using four 3×3 filter kernels. An output of the second convolution layer 1030 may be input to a second activation layer 1040. The second activation layer 1040 may apply the non-linear feature to input data.

Feature maps 1045 output from the second activation layer 1040 may be input to a third convolution layer 1050. 3×3 λ1 indicated in the third convolution layer 1050 shown in FIG. 10 illustrates convolution processing to generate one output image by using one 3×3 filter kernel. The third convolution layer 1050, which is a layer for outputting a final image, may generate one output by using one filter kernel. According to an embodiment, the third convolution layer 1050 may output a third image 1055 from a convolution operation result.

DNN configuration information indicating the number of filter kernels, parameters of a filter kernel, etc., of the first convolution layer 1010, the second convolution layer 1030, and the third convolution layer 1050 of the second DNN 1000 may be provided in plural as described below, and the plurality of pieces of DNN configuration information need to be connected with a plurality of pieces of DNN configuration information of the first DNN. Connection between the plurality of pieces of DNN configuration information of the second DNN and the plurality of pieces of DNN configuration information of the first DNN may be implemented through joint training of the first DNN and the second DNN.

FIG. 10 illustrates that the second DNN 1000 includes three convolution layers 1010, 1030, and 1050 and two activation layers 1020 and 1040, but this illustration is merely an example and the number of convolution layers and the number of activation layers may vary depending on an implementation example. In addition, according to an implementation example, the second DNN 1000 may be implemented through a recurrent neural network (RNN). In this case, it may mean that a convolutional neural network (CNN) structure of the second DNN 1000 according to an example of the disclosure is changed to an RNN structure.

Figure 11:
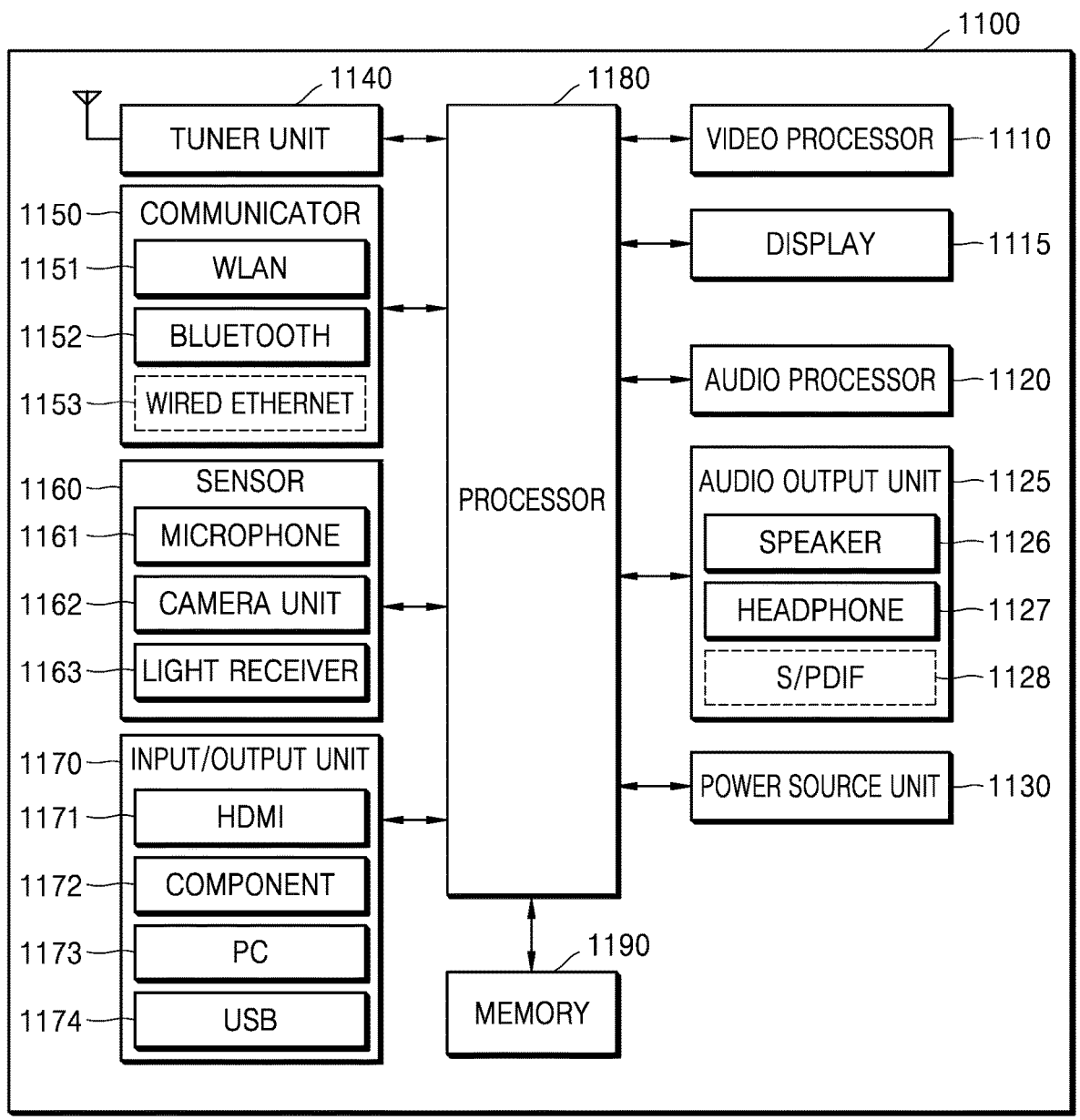
FIG. 11 is another block diagram of a display apparatus according to an embodiment.

FIG. 11 is another block diagram of a display apparatus 1100, according to an embodiment.

Referring to FIG. 11, a display apparatus 1100 may correspond to the display apparatus (e.g., 100, 30, 400, or 502) described above with reference to FIGS. 1 through 3, 4A, 4B, 5A through 5C, 6A, 6B, 7A, 7B, and 8 through 10.

Thus, when the display device 1100 is described, a description overlapping with that made with reference to FIGS. 1 through 3, 4A, 4B, 5A through 5C, 6A, 6B, 7A, 7B, and 8 through 10 may be omitted below.

More specifically, a processor 1180, a display 1115, a communicator 1150, and a memory 1190 included in the display apparatus 1100 illustrated in FIG. 11 may correspond to the processor 310, the display 330, the communicator 320, and the memory 340 included in the display apparatus 400 shown in FIG. 4A, respectively.

A video processor 1110 may perform processing on video data received by the display apparatus 1100. The video processor 1110 may perform various image processing, such as decoding, scaling, noise filtering, frame rate conversion, resolution conversion, etc., with respect to video data.

The processor 1180 may receive a recording request for the video data processed in the video processor 1110 and encode the video data to record the encoded video data in a memory device included in a processor 1180 or a memory 1190, e.g., a RAM.

The display 1115 may display video included in a broadcasting signal received through a tuner unit 1140 (e.g., tuner) on the screen, under control of the processor 1180. The display 1115 may display content (e.g., a moving image) input through the communicator 1150 or an input/output unit 1170.

The display 1115 may output an image stored in the memory 1190 under control of the processor 1180. The display 1115 may display a voice user interface (UI) (e.g., including a voice instruction guide) for performing a voice recognition task corresponding to voice recognition or a motion UI (e.g., including a user motion guide for motion recognition) for performing a motion recognition task corresponding to motion recognition.

An audio processor 1120 may process audio data. The audio processor 1120 may perform various processing such as decoding, amplification, noise filtering, etc., on the audio data. Meanwhile, the audio processor 1120 may include a plurality of audio processing modules to process audio corresponding to a plurality of contents.

An audio output unit 1125 may output audio included in a broadcasting signal received through the tuner unit 1140 under control of the processor 1180. The audio output unit 1125 may output audio (e.g., voice, sound, etc.) input through the communicator 1150 or the input/output unit 1170. The audio output unit 1125 may output audio stored in the memory 1190 under control of the processor 1180. The audio output unit 1125 may include at least one of a speaker 1126, a headphone output terminal 1127, or a Sony/Phillips digital interface (S/PDIF) output terminal 1128. The audio output unit 1125 may include a combination of the speaker 1126, the headphone output terminal 1127, and the S/PDIF output terminal 1128.

A power source unit 1130 (e.g., power supply) may supply power, which is input from an external power source, to internal components 1110 through 1190 of the display apparatus 1100, under control of the processor 1180. The power source unit 1130 may supply power, which is output from one or more batteries included in the display apparatus 1100, to the internal components 1110 through 1190, under control of the processor 1180.

The tuner unit 1140 may select a frequency of a channel the display apparatus 1100 is to receive, from among many electric wave components by tuning the frequency through amplification, mixing, resonance, or the like with respect to a broadcasting signal received wiredly or wirelessly. The broadcasting signal may include audio, video, and additional information (for example, an electronic program guide (EPG)).

The tuner unit 1140 may receive a broadcasting signal in a frequency band corresponding to a channel number (e.g., cable broadcasting #506), based on a user input (e.g., a control signal received from a control device (not shown, e.g., a remote controller), such as a channel number input, a channel up-down input, and a channel input on an EPG screen).

The tuner unit 1140 may receive a broadcasting signal from various sources such as terrestrial broadcasting, cable broadcasting, satellite broadcasting, Internet broadcasting, and so forth. The tuner unit 1140 may receive a broadcasting signal from a source such as analog broadcasting, digital broadcasting, or the like. The broadcasting signal received through the tuner unit 1140 may be decoded (e.g., audio-decoded, video-decoded, or additional-information-decoded) and separated into audio, video, and/or additional information. The separated audio, video, and/or additional information may be stored in the memory 1190 under control of the processor 1180.

The display apparatus 1100 may include one tuner unit 1140 or a plurality of tuner units 1140. According to an embodiment, when the display apparatus 1100 includes a plurality of tuner units 1140, a plurality of broadcasting signals may be output on a plurality of partial screens forming a multi-view screen provided in the display 1115.

The tuner unit 1140 may be implemented as all-in-one with the display apparatus 1100 or as a separate device including a tuner unit electrically connected with the display apparatus 1100 (e.g., a set-top box or a tuner unit connected to the input/output unit 1170).

The communicator 1150 may connect the display apparatus 1100 with an external device (e.g., a server, etc.) under control of the processor 1180. The processor 1180 may transmit/receive contents to/from an external device connected through the communicator 1150, download an application from the external device, or browse the web. More specifically, the communicator 1150 may access a network to receive content from an external device.

As described above, the communicator 1150 may include at least one of a short-range communication module, a wired communication module, or a mobile communication module.

In FIG. 11, a case is illustrated as an example where the communicator 1150 includes one of a WLAN 1151, a Bluetooth communicator 1152, or wired Ethernet 1153.

The communicator 1150 may include a module combination including any one or more of the WLAN 1151, the Bluetooth communicator 1152, and the wired Ethernet 1153. The communicator 1150 may receive a control signal of a control device under control of the processor 1180. The control signal may be implemented as a Bluetooth type, a radio frequency (RF) signal type, or a WiFi type.

The communicator 1150 may further include other short-range communications (e.g., near field communication (NFC), a separate Bluetooth Low Energy (BLE) module, etc.) in addition to Bluetooth.

A sensor 1160 may sense a voice, an image, or an interaction of the user.

A microphone 1161 may receive an uttered voice of the user. The microphone 1161 may convert the received voice into an electric signal and output the electric signal to the processor 1180. The user's voice may include, for example, a voice corresponding to a menu or a function of the display apparatus 1100. For example, a recognition range of the microphone 1161 may be recommended to fall within a range of about 4 m from the microphone 1161 to a user's position, and may vary with the volume of the voice of the user and a surrounding environment (e.g., a speaker sound, a surrounding noise, etc.).

The microphone 1161 may be implemented as an integral or separate type with the display apparatus 1100. The separated microphone 1161 may be electrically connected with the display apparatus 1100 through the communicator 1150 or the input/output unit 1170.

It is understood that the microphone 1161 may be omitted depending on the capabilities or structure of the display apparatus 1100.

The camera unit 1162 (e.g., camera) may receive an image (e.g., a continuous frame) corresponding to a user's motion including a gesture in a recognition range thereof. For example, the recognition range of the camera unit 1162 may be a distance of about 0.1 m-about 5 m from the camera unit 1162 to the user. A user motion may include a motion of a part of a body of the user or a part of the user, such as a face, a facial expression, a hand, a fist, a finger, etc., of the user. The camera unit 1162 may convert an image received under control of the processor 1180 into an electric signal and output the electric signal to the processor 1180.

The processor 1180 may select a menu displayed on the display apparatus 1100 by using a result of the recognition with respect to a received motion or perform control corresponding to the result of the recognition with respect to the received motion. For example, the control may include channel control, volume control, and indicator movement.

The camera unit 1162 may include a lens and an image sensor. The camera unit 1162 may support optical zoom or digital zoom by using a plurality of lenses and image processing. The recognition range of the camera unit 1162 may be set variously according to a camera angle and surrounding environment conditions. When the camera unit 1162 includes a plurality of cameras, a three-dimensional (3D) still image or a 3D motion may be received using the plurality of cameras.

The camera unit 1162 may be implemented as an integral or separate type with the display apparatus 1100. A separate device including the separated camera unit 1162 may be electrically connected with the display apparatus 1100 through the communicator 1150 or the input/output unit 1170.

It is understood that the camera unit 1162 may be omitted depending on the capabilities or structure of the display apparatus 1100.

A light receiver 1163 may receive a light signal (including a control signal) received from an external control device through a lighting window of a bezel of the display 1115. The light receiver 1163 may receive a light signal corresponding to a user input (e.g., a touch, a press, a touch gesture, a voice, or a motion) from a control device. A control signal may be extracted from the received light signal under control of the processor 1180.

For example, the light receiver 1163 may receive a signal corresponding to a pointing position of the control device and transmit the received signal to the processor 1180. For example, when a UI screen for receiving data or a command from the user through the display 1115 is output and the user is to input the data or the command to the display apparatus 1100 through the control device, once the user moves a control device while touching a touch pad provided on the control device by a finger, then the light receiver 1163 may receive a signal corresponding to the movement of the control device and transmit the signal to the processor 1180.

The light receiver 1163 may also receive a signal indicating press of a button provided on the control device and transmit the signal to the processor 1180. For example, when the user presses the touch pad provided as a button type on the control device by a finger, the light receiver 1163 may receive a signal indicating the press of the button-type touch pad and transmit the signal to the processor 1180. For example, the signal corresponding to the press of the button-type touch pad may be used as a signal for selecting one of items.

The input/output unit 1170 (e.g., inputter/outputter) may receive video (e.g., moving images, etc.), audio (e.g., a voice, music, etc.), and additional information (e.g., an EPG, etc.) from the outside of the display apparatus 1100, under control of the processor 1180. The input/output unit 1170 may include one of a high-definition multimedia interface (HDMI) port 1171, a component jack 1172, a PC port 1173, and a universal serial bus (USB) port 1174. The input/output unit 1170 may include a combination of the HDMI port 1171, the component jack 1172, the PC port 1173, and the USB port 1174.

It is understood that the construction and operation of the input/output unit 1170 may be implemented variously according to an embodiment.

The processor 1180 may control an overall operation of the display apparatus 1100 and a signal flow among internal components of the display apparatus 1100, and process data. The processor 1180 may execute an operating system (OS) and various applications stored in the memory 1190, when there is a user input or a preset and stored condition is satisfied.

The processor 1180 may include a RAM that stores a signal or data input from the outside of the display apparatus 1100 or is used as a storage region corresponding to various tasks performed in the display apparatus 1100, a ROM having stored therein a control program for controlling the display apparatus 1100, and a processor.

The processor may include a graphic processing unit (GPU, not shown) for processing graphics corresponding to video. The processor may be implemented as a system on chip (SoC) in which a core and a GPU are integrated. The processor may include a single core, a dual core, a triple core, a quad core, and multiple cores thereof.

The processor may also include a plurality of processors. For example, the processor may be implemented as a main processor and a sub processor which operates in a sleep mode.

The graphic processor may generate a screen including various objects such as an icon, an image, a text, etc., by using a calculator and a renderer. The calculator may calculate an attribute value such as coordinates, shapes, sizes, colors, etc., of respective objects based on a layout of the screen by using the user's interaction sensed by the sensor. The renderer may generate a screen of various layouts including an object based on the attribute value calculated by the calculator. The screen generated by the renderer may be displayed in a display region of the display 1115.

An operating method of the display apparatus according to an embodiment may be implemented in the form of a program command that is executable through various computer means, and may be recorded in a computer-readable medium. In addition, an embodiment may include a computer-readable recording medium having recorded thereon one or more programs including instructions for executing the operating method of the display apparatus.

The computer-readable recording medium may include a program command, a data file, a data structure and the like solely or in a combined manner. The program command recorded in the computer-readable recording medium may be a program command specially designed and configured for the disclosure or a program command known to be used by those of skill in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM) and flash memory, etc. Examples of the program command include a machine language code generated by a compiler and a high-level language code executable by a computer using an interpreter.

The machine-readable storage medium may be provided in the form of a non-transitory storage medium. Wherein, the term 'non-transitory storage medium' simply means that the storage medium is a tangible device, and does not include a transitory electrical signal (e.g., an electromagnetic wave), but this term does not differentiate between where data is semi-permanently stored in the storage medium and where the data is temporarily stored in the storage medium. For example, the 'non-transitory storage medium' may include a buffer in which data is temporarily stored.

According to an embodiment, an operating method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least a part of the computer program product (e.g., a downloadable app) may be temporarily generated or at least temporarily stored in the machine-readable storage medium, such as memory of the manufacturer's server, a server of the application store, or a relay server.

More specifically, an operating method of a display apparatus according to an embodiment may be implemented by a computer program product including a recording medium having stored therein a program for performing operations of obtaining a sentence composed in multiple languages, obtaining vectors respectively corresponding to words included in the sentence composed in the multiple languages, transforming the obtained vectors into vectors corresponding to a target language, and obtaining a sentence composed in the target language based on the transformed vectors.

A display apparatus and an operating method thereof according to an embodiment may accurately classify a resolution for content received from a server and provide resolution information regarding the content to the user.

More specifically, when there is downscaled content among contents received from the server, the display apparatus and the operating method thereof according to an embodiment may accurately classify a resolution for the downscaled content and provide resolution information regarding the content to the user.

While the disclosure has been shown and described with reference to certain example embodiments thereof, the scope of the disclosure is not limited to the description and also includes various modifications and improvements made by those of ordinary skill in the art using the concept of the disclosure defined in the appended claims.

What is claimed is:

1. An operating method of a display apparatus, the operating method comprising:
    transmitting, to a server, a transmission request for content-related information and resolution information of the display apparatus;
    receiving, from the server, the content-related information corresponding to the transmission request;
    obtaining a resolution of the content from the content-related information;
    identifying a final resolution of the content based on whether the display apparatus supports upscaling; and
    displaying information on the content, the information comprising the final resolution of the content,
    wherein the identifying the final resolution comprises:
    based on the display apparatus supporting the upscaling, identifying the final resolution as a higher resolution which is obtained by the upscaling of the display apparatus, and
    based on the display apparatus not supporting the upscaling, identifying the final resolution as the resolution of the content which is obtained from the content-related information.

2. The operating method of claim 1, wherein:
    the content is content downscaled using a first scheme; and
    the identifying the final resolution comprises:
        determining whether to classify the resolution of the content as the higher resolution, based on whether the display apparatus supports upscaling; and
        identifying the final resolution, based on a result of the determining.

3. The operating method of claim 2, wherein the determining comprises classifying the resolution of the content downscaled using the first scheme as the higher resolution when the display apparatus supports upscaling using a second scheme corresponding to the first scheme.

4. The operating method of claim 3, wherein:
    the first scheme is a scheme to downscale a resolution by performing artificial intelligence (AI) encoding; and
    the second scheme is a scheme to upscale a resolution by performing AI decoding.

5. The operating method of claim 2, wherein the identifying the final resolution comprises identifying the final resolution as the resolution of the content which is obtained from the content-related information, when the display apparatus does not support upscaling using a second scheme corresponding to the first scheme.

6. The operating method of claim 1, wherein, when the content is content downscaled using a first scheme, the content-related information comprises the resolution of the content and information indicating that the content is the downscaled content.

7. The operating method of claim 1, wherein:
    the transmission request comprises a transmission request for a content list of contents providable by the server; and
    the operating method further comprises generating a final content list including at least one of a final resolution respectively corresponding to at least one content.

8. The operating method of claim 7, wherein:
    the content list comprises a plurality of contents comprising first content that is downscaled using a first scheme to have a first resolution; and the obtaining the final resolution comprises obtaining the final resolution by classifying the resolution of the first content as a second resolution that is higher than the first resolution, when the display apparatus supports upscaling using a second scheme corresponding to the first scheme.

9. The operating method of claim 8, wherein the obtaining the final resolution further comprises obtaining the final resolution by classifying the resolution of the first content as the first resolution, when the display apparatus does not support upscaling using the second scheme.

10. The operating method of claim 7, wherein the generating the final content list comprises, when the plurality of contents included in the content list comprises the first content that has the first resolution and is downscaled using the first scheme:
   classifying the first content as a content group corresponding to the second resolution higher than the first resolution, when the display apparatus supports upscaling using the second scheme corresponding to the first scheme; and
   classifying the first content as a content group corresponding to the first resolution, when the display apparatus does not support upscaling using a second scheme corresponding to the first scheme.

11. The operating method of claim 1, wherein:
   the transmission request is a transmission request for a partial list comprising contents corresponding to a first resolution;
   the operating method further comprises generating a final content list including at least one of the final resolution respectively corresponding to at least one content included in the partial list; and
   when the display apparatus supports upscaling, the final content list comprises at least one content having the first resolution and at least one content downscaled to have a third resolution lower than the first resolution, among all of the contents providable by the server.

12. A display apparatus comprising:
   a display;
   a communicator configured to communicate with a server; and
   a processor configured to execute at least one instruction to:
      control the communicator to transmit, to the server, a transmission request for content-related information and resolution information of the display apparatus, receive, from the server through the communicator, the content-related information corresponding to the transmission request,
      obtain a resolution of the content from the content-related information;
      identify a final resolution of the content based on whether the display apparatus supports upscaling,
      display, on the display, information on the content, the information comprising the final resolution of the content,
      based on the display apparatus supporting the upscaling, identify the final resolution as a higher resolution which is obtained by the upscaling of the display apparatus, and
      based on the display apparatus not supporting the upscaling, identify the final resolution as the resolution of the content which is obtained from the content-related information.

13. The display apparatus of claim 12, wherein;
   the content is content downscaled using a first scheme; and
   the processor, by executing the at least one instruction, is further configured to determine whether to classify the resolution of the content as a higher resolution, based on whether the display apparatus supports upscaling.

14. The display apparatus of claim 13, wherein the processor, by executing the at least one instruction, is further configured to identify the final resolution by classifying the resolution of the content downscaled using the first scheme as the higher resolution when the display apparatus supports upscaling using a second scheme corresponding to the first scheme.

15. The display apparatus of claim 13, wherein the processor, by executing the at least one instruction, is further configured to identify the final resolution as the resolution of the content which is obtained from the content-related information, when the display apparatus does not support upscaling using a second scheme corresponding to the first scheme.

16. The display apparatus of claim 12, wherein the processor comprises an artificial intelligence (AI) decoder configured to upscale a resolution of content to a higher resolution by performing AI decoding, the content having been downscaled using a first scheme.

17. The display apparatus of claim 16, wherein the AI decoder comprises a deep neural network (DNN) configured to receive an input of image data corresponding to the content, upscale a resolution of the image data, and output an image which has the upscaled resolution.

18. The display apparatus of claim 12, wherein:
   the transmission request comprises a transmission request for a content list of contents providable by the server; and
   the processor, by executing the at least one instruction, is further configured to generate a final content list including at least one of a final resolution respectively corresponding to at least one content.

19. The display apparatus of claim 12, wherein:
   the content list comprises a plurality of contents comprising first content that is downscaled using a first scheme to have a first resolution; and
   the processor, by executing the at least one instruction, is: further configured to obtain the final resolution by classifying the resolution of the first content as a second resolution that is higher than the first resolution, when the display apparatus supports upscaling using a second scheme corresponding to the first scheme.

20. A non-transitory computer-readable recording medium having recorded thereon instructions executable by at least one processor to perform an operating method of an image processing device, the operating method comprising:
   transmitting, to a server, a transmission request for content-related information and resolution information of a display;
   receiving, from the server, the content-related information corresponding to the transmission request;
   obtaining a resolution of the content from the content-related information;
   identifying a final resolution of the content based on whether the display supports upscaling; and
   outputting for display, on the display, information on the content, the information comprising the final resolution of the content, wherein the identifying the final resolution comprises:
based on the display apparatus supporting the upscaling, identifying the final resolution as a higher resolution which is obtained by the upscaling of the display apparatus, and
based on the display apparatus not supporting the upscaling, identifying the final resolution as the resolution of the content which is obtained from the content-related information.

* * * * *